(12) United States Patent
Constanzo et al.

(10) Patent No.: US 9,108,801 B2
(45) Date of Patent: Aug. 18, 2015

(54) CONVEYOR BELT HAVING BIDIRECTIONAL STACKED ROLLERS

(71) Applicant: Laitram, L.L.C., Harahan, LA (US)

(72) Inventors: Mark Constanzo, River Ridge, LA (US); Dennis K. Scates, Kennesaw, GA (US); David H. Myers, River Ridge, LA (US); Glenn R. McCall, Jr., Harvey, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 99 days.

(21) Appl. No.: 14/035,601

(22) Filed: Sep. 24, 2013

(65) Prior Publication Data

US 2014/0090961 A1    Apr. 3, 2014

Related U.S. Application Data

(60) Provisional application No. 61/708,664, filed on Oct. 2, 2012.

(51) Int. Cl.
*B65G 17/16* (2006.01)
*B65G 17/24* (2006.01)
*B65G 47/53* (2006.01)

(52) U.S. Cl.
CPC ............... *B65G 17/24* (2013.01); *B65G 47/53* (2013.01)

(58) Field of Classification Search
CPC ...... B65G 17/06; B65G 17/24; B65G 17/002; B65G 17/005
USPC ............................................ 198/779, 370.09
See application file for complete search history.

(56) References Cited

U.S. PATENT DOCUMENTS

| 4,880,107 | A  | 11/1989 | Deal |
| 5,096,050 | A  | 3/1992  | Hodlewsky |
| 6,318,544 | B1 | 11/2001 | O'Connor et al. |
| 6,398,015 | B1 | 6/2002  | Sedlacek et al. |
| 6,494,312 | B2 | 12/2002 | Costanzo |
| 6,571,937 | B1 | 6/2003  | Costanzo et al. |
| 6,968,941 | B2 | 11/2005 | Fourney |
| 7,249,669 | B2 | 7/2007  | Fourney |
| 7,357,246 | B2 | 4/2008  | Costanzo |

(Continued)

FOREIGN PATENT DOCUMENTS

WO    2012151127 A1    11/2012

OTHER PUBLICATIONS

International Search Report and Written Opinion of the International Searching Authority, PCT/US2013/061515, mailed Jan. 16, 2014, Korean Intellectual Property Office, Republic of Korea.

*Primary Examiner* — James R Bidwell
(74) *Attorney, Agent, or Firm* — James T. Cronvich

(57) ABSTRACT

A conveyor belt and a belt module having multiple roller sets, each roller set including a bottom roller in contact with an axially elongated top roller. Driving the bottom roller in a first direction causes rotation of the top roller in an opposite angular direction. The bottom rollers in first longitudinal lanes are arranged to rotate obliquely toward one side of the belt, and the bottom rollers in second lanes are arranged to rotate toward the other side of the belt. Either the first lanes of roller sets or the second lanes can be selectively actuated to direct articles conveyed atop the top rollers rearward and toward one side of the belt or the other or to receive articles fed onto the belt from either side.

34 Claims, 17 Drawing Sheets

(56) References Cited

U.S. PATENT DOCUMENTS

| | | |
|---|---|---|
| 7,360,641 B1 | 4/2008 | Fourney |
| 7,588,137 B2 | 9/2009 | Fourney |
| 7,971,701 B2 | 7/2011 | Fourney |
| 8,225,922 B1 | 7/2012 | Fourney |
| 8,424,675 B2 * | 4/2013 | Rau .............................. 198/779 |
| 8,678,180 B2 * | 3/2014 | Marshall et al. ............... 198/853 |
| 8,783,449 B2 * | 7/2014 | Murakami .................... 198/850 |
| 2003/0221932 A1 | 12/2003 | Costanzo |
| 2010/0108468 A1 | 5/2010 | Fourney |
| 2011/0303512 A1 | 12/2011 | Rau |
| 2013/0240330 A1 | 9/2013 | Schwai et al. |
| 2014/0027250 A1 | 1/2014 | Marshall et al. |

* cited by examiner

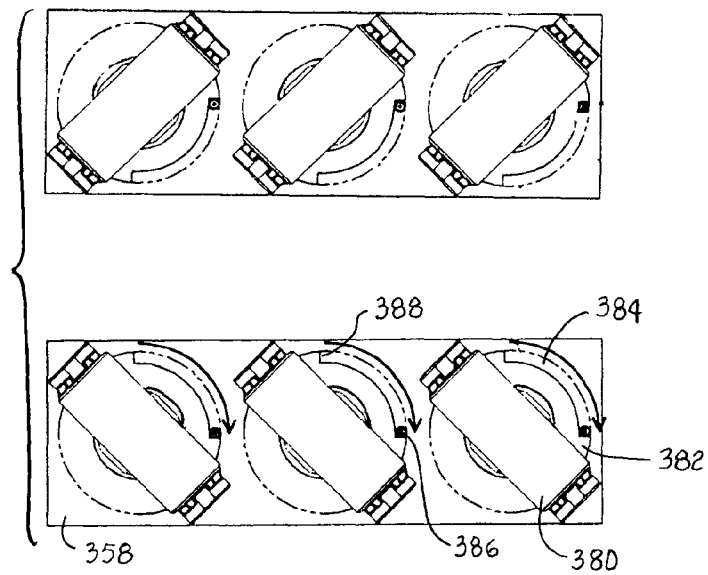
FIG. 35
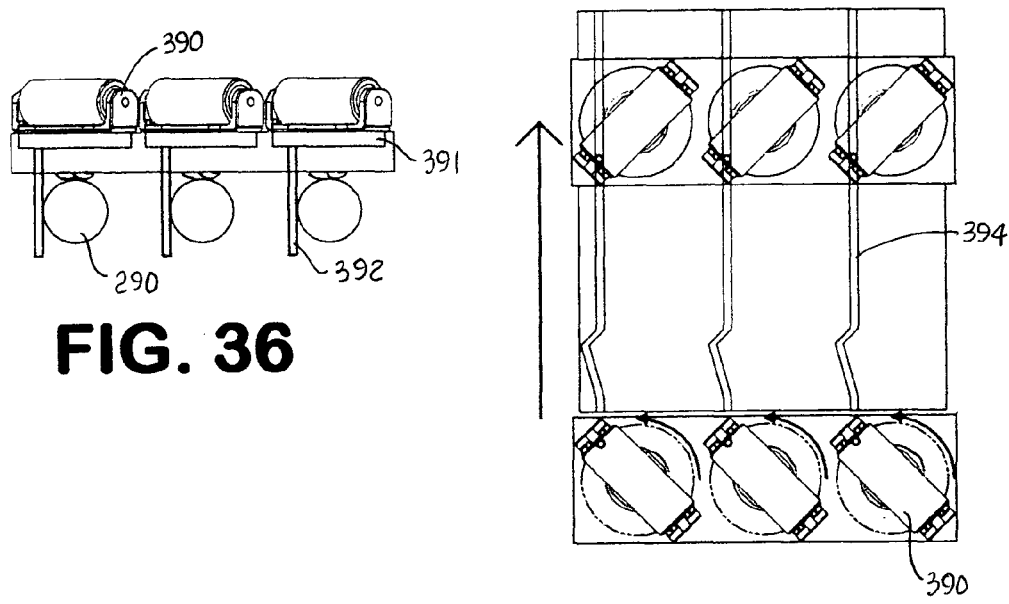
FIG. 36
FIG. 37

CONVEYOR BELT HAVING BIDIRECTIONAL STACKED ROLLERS

BACKGROUND

The invention relates generally to power-driven conveyors and more particularly to conveyor belts having sets of stacks of rollers arranged to rotate in different directions to direct conveyed articles atop the rollers in different directions.

Conveyor belts sometimes include stacked pairs of rollers that are actively rotated to propel articles rearward along the conveyor belt. The roller at the bottom of the stack rolls on a bearing surface underlying the conveyor belt as the belt advances along a conveyor carryway. The forward rotation of the bottom roller contacting the top roller in the stack causes the top roller to rotate in the opposite direction to propel articles conveyed atop the top roller to be pushed rearward on the conveyor belt. The stacked pairs of rollers can also be used passively to help induct articles onto the conveyor belt from the side. In passive operation, the rollers are not actuated, but rotate freely to allow the momentum of an article to roll the freely rotatable rollers in a direction easing the article onto the conveyor belt.

Modular plastic conveyor belts with stacked rollers are especially useful in diverting articles across the conveyor on sharp trajectories. In modular plastic belts, such as INTRALOX® Series 400 Dual-Activated Roller belt, manufactured and sold by Intralox, L.L.C., Harahan, La., U.S.A., the stacks of rollers are mounted in cavities across each modular plastic belt row. The axes of rotation of all the rollers are parallel, so all articles are propelled in the same direction. So articles can be diverted off only one side of the belt and can be fed onto the belt from only one side. Furthermore, because each top roller is relatively short and does not extend beyond the confines of its belt row, gaps are formed between the top rollers at the hinge joints between consecutive belt rows. Articles with small footprints or bottom appendages can get caught in those gaps to tip over.

SUMMARY

These shortcomings and others are addressed by a conveyor belt embodying features of the invention. One version of such a conveyor belt comprises first and second roller belts. The roller sets are arranged in lanes extending in a longitudinal direction of the conveyor belt. Each roller set includes two rollers in contact with each other so that driving of one of the rollers in one angular direction causes the other roller to rotate in the opposite direction. The rollers in the first roller set have axes of rotation arranged at a first angle relative to the longitudinal direction of the conveyor belt. The rollers in the second roller set have axes of rotation arranged at a second angle relative to the longitudinal direction different from the first angle.

Another version of a conveyor belt embodying features of the invention comprises a plurality of holders pivotably retained in the conveyor belt. Rotatably mounted in each of the holders is a stacked roller set that has a top roller and a bottom roller. The top and bottom rollers contact each other such that driving the bottom roller in an angular direction relative to a direction of belt travel causes rotation of the top roller in an opposite angular direction. The holders include pivot elements on their peripheries of for receiving a force to pivot the stacked roller sets between a first angular direction and a different second angular direction.

In another aspect, one version of a conveyor embodying features of the invention comprises a conveyor belt that includes a plurality of holders pivotably retained in the conveyor belt and a plurality of stacked roller sets, each having a top roller and a bottom roller rotatably mounted in one of the holders. The top and bottom rollers contact each other such that driving of the bottom roller in an angular direction relative to a direction of belt travel causes rotation of the top roller in an opposite angular direction. The holders include pivot elements for receiving a force to pivot the stacked roller sets between a first angular direction and a different second angular direction. A pivot member external to the conveyor belt and coupled to the pivot elements applies the force to pivot the stacked roller sets.

Another version of a conveyor comprises a conveyor belt that includes first roller sets arranged in first lanes extending in a longitudinal direction of the conveyor belt and second roller sets arranged in second lanes parallel to the first lanes. Each of the first and second roller sets includes a bottom roller and a top roller. The bottom and top rollers contact each other such that driving of the bottom roller of the first set in a first angular direction causes rotation of the top roller in an opposite second angular direction. The bottom and top rollers of the first set have axes of rotation arranged at a first angle relative to the longitudinal direction of the conveyor belt. The bottom and top rollers of the second set contact each other such that driving of the bottom roller of the second set in a third angular direction causes rotation of the top roller in an opposite fourth angular direction. The bottom and top rollers of the second set have axes of rotation arranged at a second angle relative to the longitudinal direction of the conveyor belt different from the first angle. A plurality of holders supporting the first and the second roller sets are slidably mounted in the conveyor belt for being raised and lowered. Bearing surfaces underlying the conveyor belt under the first and second lanes raise the first and second roller sets by contact with the holders.

Another version of a conveyor comprises a plurality of conveyor belt strands arranged side by side to advance together in a longitudinal direction of belt travel. Each of the conveyor belt strands includes one or more longitudinal lanes of roller sets, each including a top roller and a bottom roller in contact with the bottom roller. The bottom roller of each of the sets extends below the bottom of the conveyor belt strand. Rotation of the bottom roller in a rotation direction causes the top roller to rotate in an opposite rotation direction. The rotation direction of a first set of the conveyor belt strands is in a first direction and the rotation direction of a second set of the conveyor belt strands is in a different second direction. A plurality of longitudinal bearing surfaces underlie the longitudinal lanes of roller sets. Actuators coupled to the bearing surfaces selectively raise or lower the bearing surfaces into or out of contact with the bottom rollers to selectively raise or lower the conveyor belt stands and to cause the bottom rollers to rotate on the raised bearing surfaces and be freely rotatable when the bearing surfaces are lowered.

BRIEF DESCRIPTION OF THE DRAWINGS

The disclosed conveyor belts and conveyors can be understood with reference to the following drawings. The components in the drawings are not necessarily to scale.

FIG. 35 is a top plan view of a belt module having pivotable roller sets shown at two limit positions set by pivot-angle limiters.

FIG. 36 is a front elevation view of a conveyor using a conveyor belt with pivotable roller sets controlled by cam arms.

FIG. 37 is a top plan view of the conveyor of FIG. 36 with guide rails below the belt controlling the cam arms.

DETAILED DESCRIPTION

Described in the following are conveyor belts having rollers that can be used to displace objects conveyed by the belts. In some embodiments, a conveyor belt comprises roller sets including top and bottom rollers, with the bottom roller extending below a bottom surface of the belt and the top roller extending above a top surface of the belt. The top and bottom rollers contact each other such that when the bottom roller is driven in a first angular direction, the top roller rotates in a second, opposite angular direction. In cases in which the rollers rotate in a direction that forms an angle with a longitudinal direction of the belt, the top rollers can be used to displace objects in a transverse and rearward direction such that objects can be diverted with relatively high diverting angles. In cases in which the rollers rotate in a direction parallel to the longitudinal direction of the belt, objects can be displaced on the belt in a direction opposite the direction of belt travel.

In the following, various embodiments of conveyor belts are disclosed. Although specific embodiments are presented, those embodiments are mere example implementations of the disclosed belts and it is noted that other embodiments are possible. All such embodiments are intended to fall within the scope of this disclosure.

Figure 1:
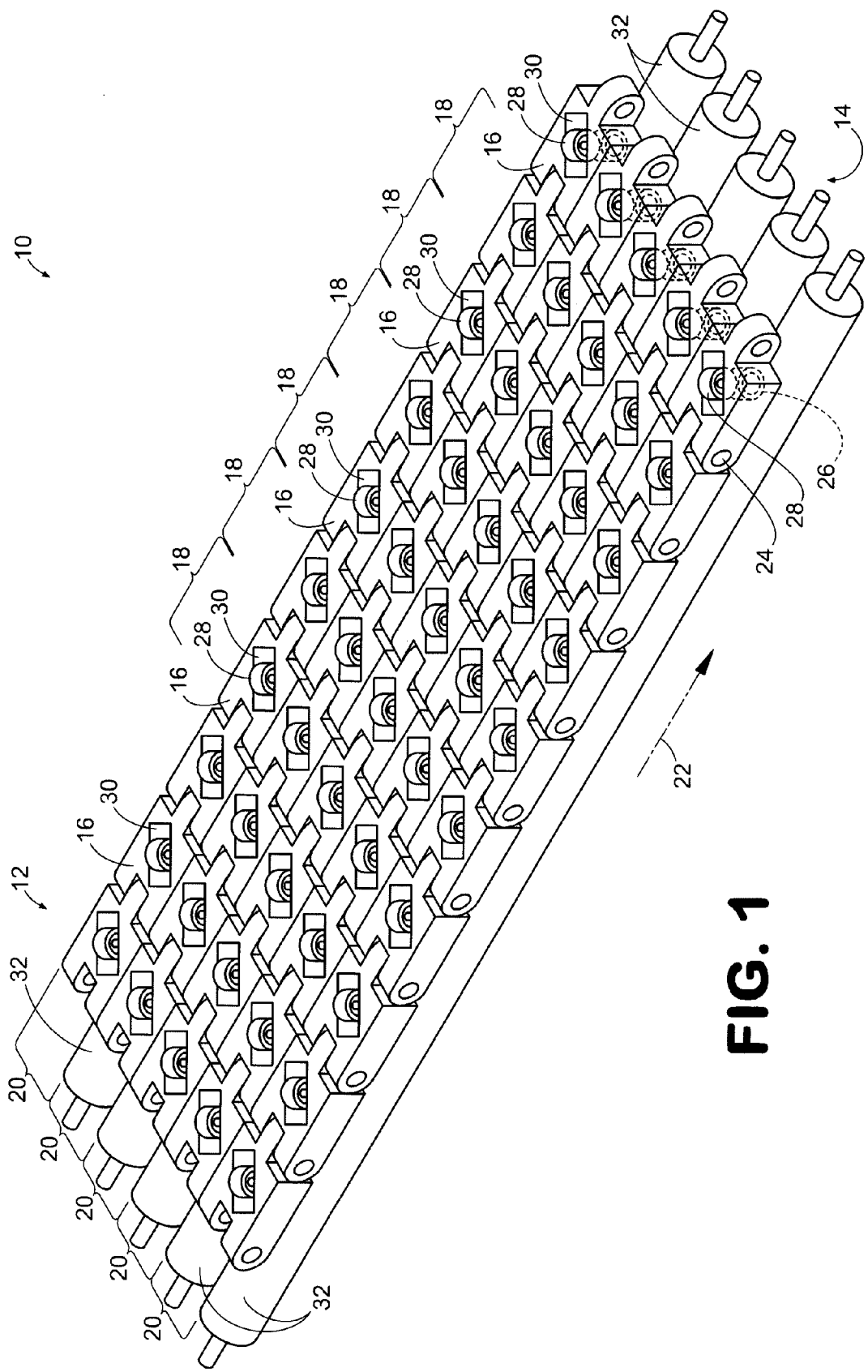
FIG. 1 is a top perspective view of a first embodiment of a portion of a conveyor.

Referring to the drawings, in which like numerals indicate corresponding parts throughout the several views, FIG. 1 illustrates an embodiment of a conveyor 10 that can be used to divert objects. As indicated in FIG. 1, the conveyor 10 comprises a conveyor belt 12 and a drive mechanism 14 with which the belt can interact. In the embodiment of FIG. 1, the conveyor belt 12 comprises a plurality of conveyor belt modules 16 that are linked together to form the belt. The modules 16 are aligned in transverse rows 18 that extend across a width of the belt 12, and in longitudinal columns 20 that extend along a longitudinal direction of the belt, which coincides with the direction of belt travel indicated by arrow 22. By way of example, the modules 16 are pivotally connected to adjacent modules along the longitudinal direction of the belt 12 with transverse shafts 24. The modules 16 include roller sets that comprise a first or bottom roller 26 and second or top roller 28 that are arranged in a vertically-stacked orientation within an inner space 30 of the modules.

Figure 7:
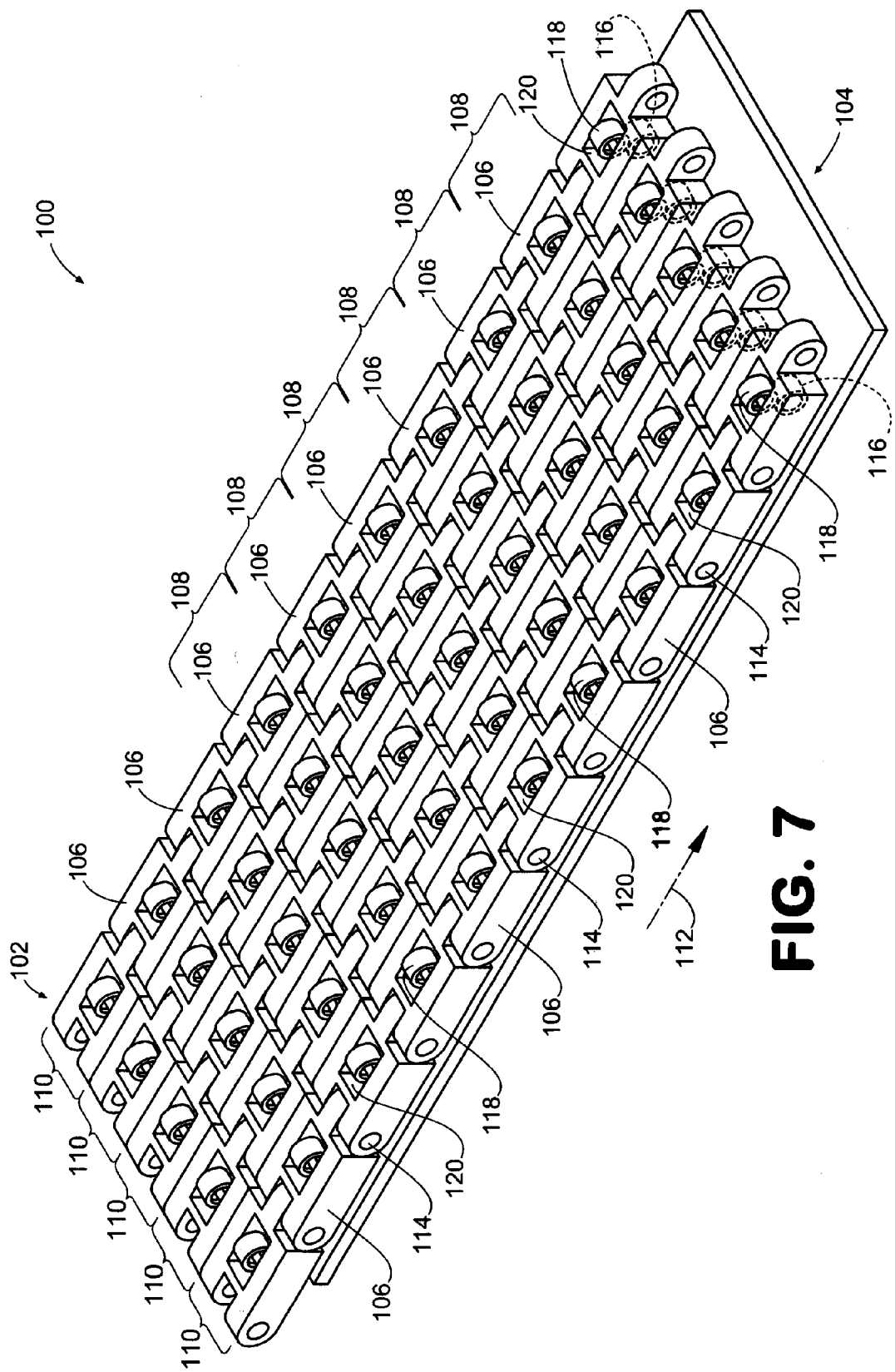
FIG. 7 is a top perspective view of a second embodiment of a portion of a conveyor.

The drive mechanism 14 is used to drive the bottom and top rollers 26, 28 of the conveyor belt modules 16. As indicated in FIG. 1, the drive mechanism 14 can comprise multiple longitudinal rollers 32 having axes of rotation that are parallel to the longitudinal direction of the conveyor belt 12 and that align with the columns 20 of conveyor belt modules 16 such that one longitudinal roller is provided for each belt column. As described in greater detail below, when the longitudinal rollers 32 are placed in contact with the bottom rollers 26 while the belt 12 is moving, frictional forces between the longitudinal rollers and the bottom rollers cause the bottom rollers to rotate, which results in opposite rotation of the top rollers 28. In at least some embodiments, the longitudinal rollers 32 have high-friction outer surfaces that reduce slip between the longitudinal rollers 32 and the bottom rollers 26. In alternative embodiments, the drive mechanism can comprise a friction plate that is used to rotate the bottom rollers 26. An example of such a friction plate is illustrated in FIG. 7.

Figure 2:
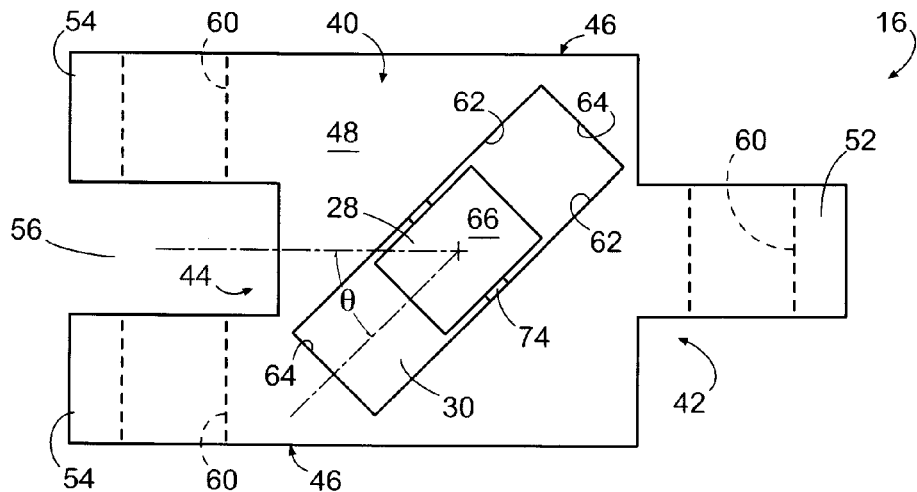
FIG. 2 is top view of an embodiment of a conveyor belt module used in the conveyor of FIG. 1.
Figure 3:
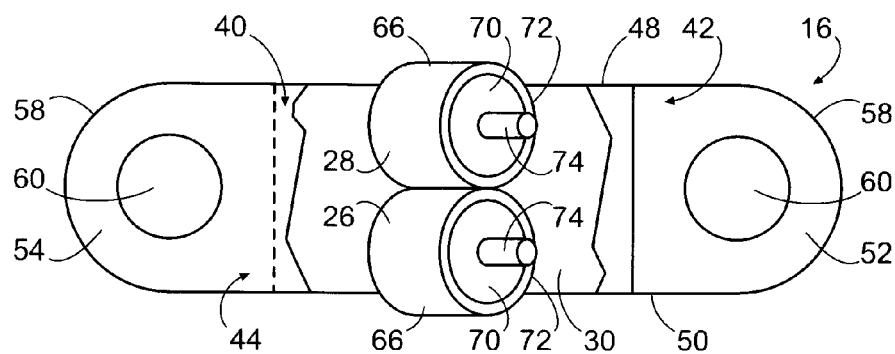
FIG. 3 is a side view of the conveyor belt module of FIG. 2.

FIGS. 2 and 3 illustrate an example embodiment for the conveyor belt module 16. As indicated in those figures, the module 16 comprises a body 40 having a front end 42, a rear end 44, and opposed lateral sides 46. Furthermore, the body 40 includes a top surface 48 and a bottom surface 50. Although particular spatial terminology such as "front" and "rear" have been used, those terms are used herein to describe the module 16 in its orientation shown in FIG. 1. Therefore, the spatial terms are not absolute and should not be interpreted as such.

In some embodiments, the module body 40 is unitarily constructed from a single piece of material, such as a polymeric material. In other embodiments, the body 40 comprises separate pieces, for example separate halves, that are connected together to form an integrated body. In such embodiments, the body 40 can be formed from a polymeric or metal material.

As shown most clearly in FIG. 2, the conveyor belt module 16 further includes connection portions that extend from body 40. In the embodiment of FIGS. 2 and 3, the module 16 comprises a single connection portion 52 that extends from the front end 42 of the body 40 and two connection portions 54 that extend from the rear end 44 of the body separated by a gap 56. With such a configuration, the modules 16 are adapted for linking to each other along the longitudinal direction of the belt. Specifically, the connection portion 52 of one module 16 can be received in the gap 56 of an adjacent module, the connection portion 52 of that adjacent module 16 can be received by the gap 56 of the next adjacent module 16, and so forth, as indicated in FIG. 1. As shown most clearly in FIG. 3, each of the connection portions 52, 54 includes a rounded outer surface 58 and a transverse opening 60 that is adapted to receive a transverse shaft, such as shaft 24 shown in FIG. 1. When the diameter of the transverse shaft is smaller than the openings 60, the modules 16 can pivotally rotate relative to the shaft and vice versa.

The module body 40 further defines the inner space 30 first identified in relation to FIG. 1. As indicated in FIG. 2, the inner space 30 can, in some embodiments, comprise a generally rectangular cross-section, when viewed from the top or bottom, defined by opposed side walls 62 and opposed end walls 64. As further indicated in FIG. 2, the side walls 62 are arranged at an angle relative to the lateral sides 46 of the module body 40, and therefore relative to a longitudinal axis of the module 16.

As is apparent from FIGS. 2 and 3, the bottom and top rollers 26, 28 are at least partially contained within the inner space 30 defined by the module body 40. As indicated in FIG. 3, outer surfaces 66 of the rollers 26, 28 contact each other such that rotation of one roller in a first direction causes opposite rotation of the other roller. A portion of the bottom roller 26 extends below the bottom surface 50 of the body 40 and a portion of the top roller 28 extends above the top surface 48 of the body. With such a configuration, the drive mechanism described in relation to FIG. 1 can contact the bottom roller 26 to cause it to rotate, and objects supported by the conveyor belt in which the module 16 is used can be displaced by the top roller 28.

Each roller can comprise a roller body 70 constructed of a polymeric or metal material that provides structure to the roller, and an outer layer 72 that is provided about an outer surface of the roller body and that forms the outer surface 66. In some embodiments, the outer layer 72 of each roller 26, 28 is composed of a high-friction material that reduces slip with mechanisms and/or objects it contacts. In other embodiments, only the outer layer 72 of the bottom roller 26 is a high-friction material so as to enable desired slipping between the top roller 28 and the objects it supports. As illustrated in both FIGS. 2 and 3, each roller 26, 28 is mounted within the inner space 30 on a roller shaft 74 that is supported by the module body 40. In some embodiments, the shafts 74 are supported by openings (not shown) formed in the body 40. In other embodiments, the shafts 74 are supported by brackets (not shown) provided within the inner space 30. Regardless, the shafts 74 are supported such that their associated rollers 26, 28 are placed in firm contact with each other to ensure that rotation of one roller (e.g., the bottom roller) will cause opposite rotation of the other roller (e.g., the top roller).

As further illustrated in FIGS. 2 and 3, the shafts 74, and therefore their associated rollers 26, 28, are supported at an angle θ, relative to a longitudinal axis of the module 16 and the conveyor belt in which it is used. In some embodiments, the angle θ can be any angle from about 1°, in which case the shaft 74 is nearly perpendicular to the longitudinal axis of the module 16, to about 89°, in which case the shaft is nearly parallel to the longitudinal axis of the module. As described in greater detail below, the angle that is selected affects the speed with which objects are diverted from the conveyor belt.

Figure 4:
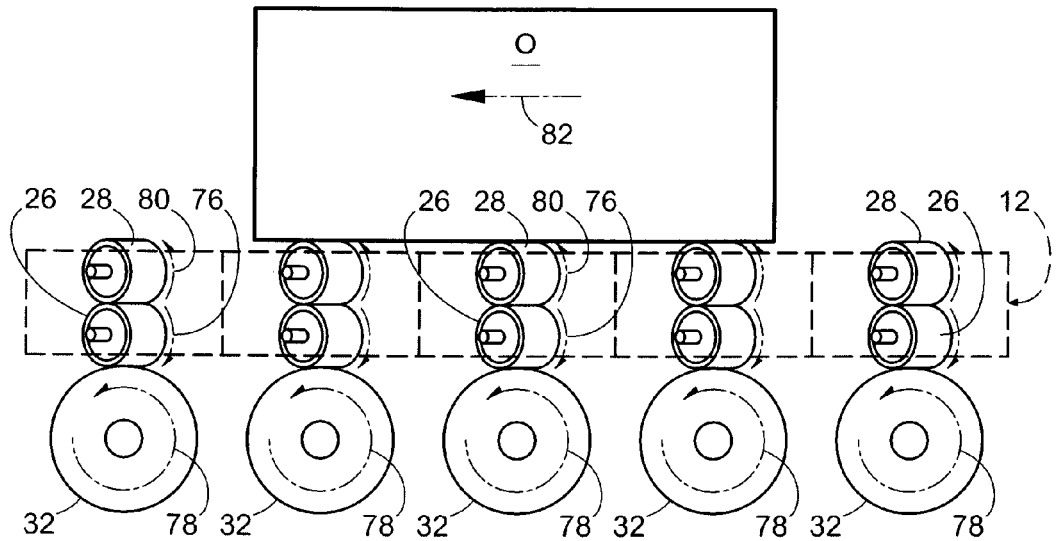
FIG. 4 is schematic end view of the conveyor of FIG. 1, illustrating diverting of an object conveyed by the conveyor.
Figure 5:
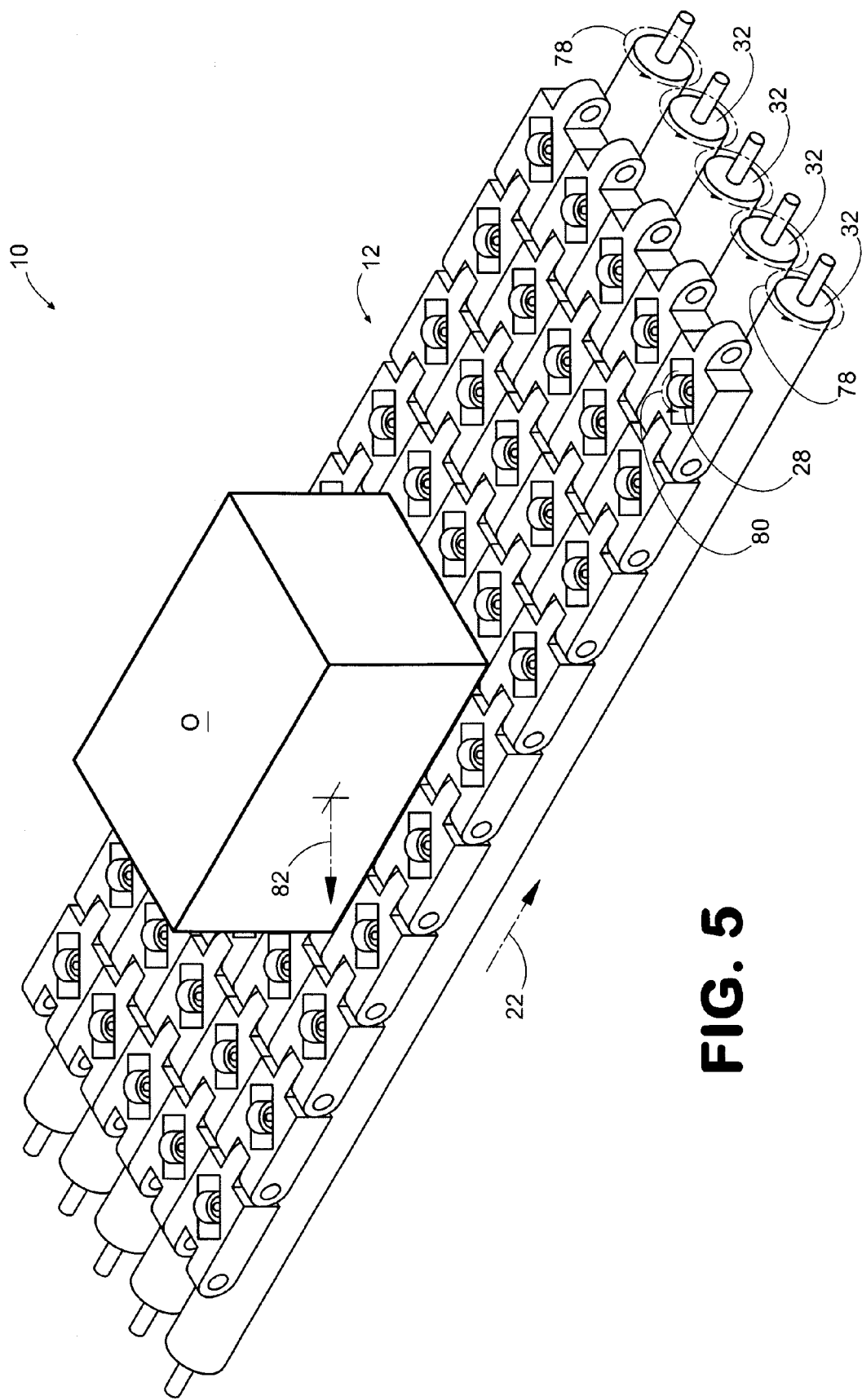
FIG. 5 is a top perspective view of the conveyor of FIG. 1, further illustrating diverting of the object by the conveyor.

FIGS. 4 and 5 illustrate diverting an object O using the conveyor 10. As indicated in FIG. 5, the conveyor belt 12 travels along the longitudinal rollers 32 in the direction of arrow 22. As indicated in FIG. 4, contact between the bottom rollers 26 and the longitudinal rollers 32 causes the bottom rollers to rotate in a downstream direction indicated by arrows 76. In addition, that contact causes the longitudinal rollers 32 to rotate in a counterclockwise direction (when viewed from a downstream position) as indicated by arrows 78. Rotation of the bottom rollers 26 causes the top rollers 28 to rotate in an opposite, upstream direction, indicated by arrows 80. As shown most clearly in FIG. 5, the rotation of the top rollers 28 displaces the object O in a transverse and rearward direction indicated by arrow 82. As used in the previous sentence, the term "rearward direction" is a relative term that indicates that the object O is displaced in a rearward direction relative to the conveyor belt 12. Since the belt 12 is travelling in the direction of arrow 22, however, the object O may not actually travel rearwardly in an absolute sense. Instead, assuming no slip between the bottom rollers 26 and the longitudinal rollers 32 and further assuming no slip between the top rollers 28 and the object O, the longitudinal position of the object will substantially not change because of the cancellation of its downstream movement by its upstream movement. In such a case, the object O is only transversely displaced by the conveyor 10.

The transverse diverting described above in relation to FIGS. 4 and 5 is illustrated in FIGS. 6A-6D. In those figures, the conveyor belt 12 travels from top to bottom as indicated by arrow 22. Positioned to one side of the conveyor belt 12 is an outfeed conveyor 84. In some embodiments, the outfeed conveyor 84 comprises its own driven conveyor belt so as to be adapted to convey a diverted object in a direction other than that in which the conveyor belt 12 travels. In other embodiments, the outfeed conveyor 84 comprises a non-driven conveyor that, for example, comprises a plurality of free-spinning wheels along which the object can travel, for instance under the force of gravity. Regardless, the outfeed conveyor 84 is adapted to receive objects diverted by the conveyor belt 12.

Figure 6A:
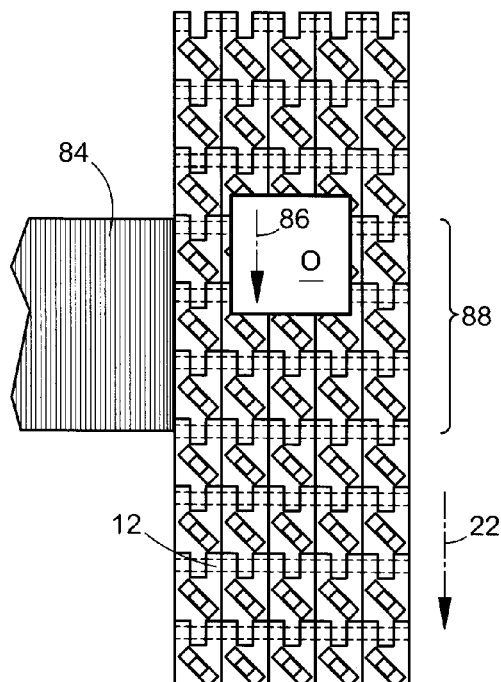
FIGS. 6A-6D are schematic views sequentially illustrating diverting of an object using the conveyor of FIG. 1.
Figure 6B:
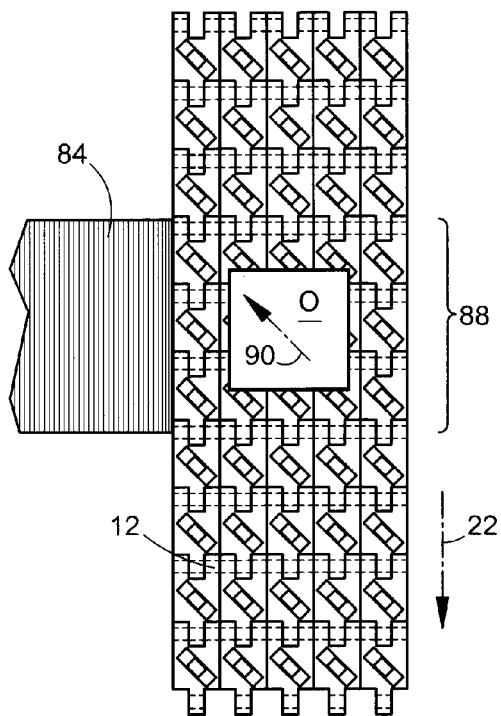
Figure 6C:
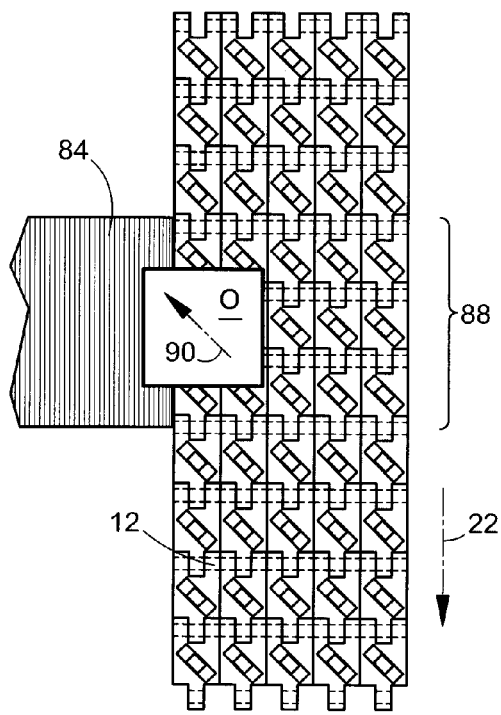
Figure 6D:
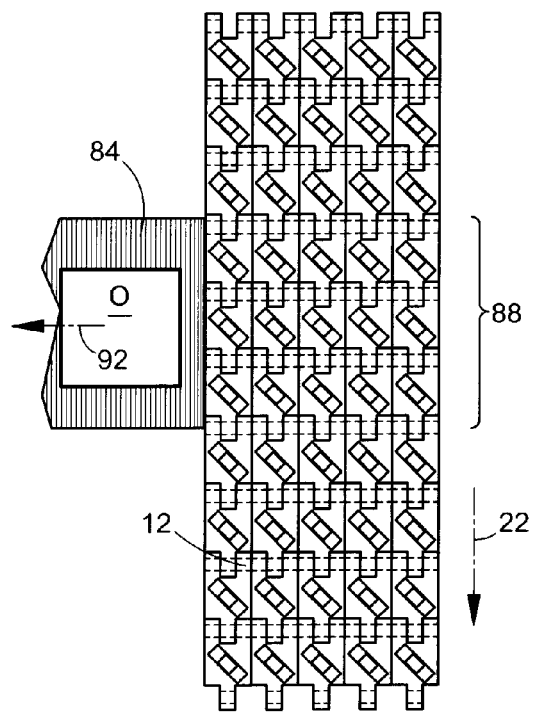

As indicated in FIG. 6A, an object O travels along the conveyor belt 12 in the direction indicated by arrow 86 and approaches a diverting area 88. Turning to FIG. 6B, once the object O enters the diverting area 88, the object is acted upon by the top rollers 28. In some embodiments, the top rollers 28 are activated in the diverting area 88 by a drive mechanism (not shown) that contacts the bottom rollers 26 of the belt only in the diverting area. In such cases, the bottom rollers 26, and the top rollers 28, will begin to rotate upon entering the diverting area 88. As indicated in FIG. 6B, rotation of the top rollers 28 causes the object O to be displaced in a transverse and rearward direction indicated by arrow 90. As described above, the rearward travel of the object O relative to the belt 12 may be substantially equivalent to forward travel of the object due to movement of the belt. In such cases, the object O does not significantly move forward or rearward in an absolute sense. Accordingly, as indicated in FIG. 6C, the object O is primarily displaced in the transverse direction toward the conveyor 84. In other words, the object O is diverted from the conveyor belt 12 at a diverting angle of approximately 90°. Notably, such a diverting angle is substantially larger than that achievable with other conveyor belts that comprise single rollers that are not provided in a stacked configuration. Continuing on to FIG. 6D, the object O is shown completely diverted from the conveyor belt 12, at which point the object may be carried away by the conveyor 84 in the direction indicated by arrow 92.

The substantially 90° diverting action described above occurs for any angle θ, selected from 1° to 89° (see FIG. 2). Therefore, objects will be diverted from the conveyor belt 12 at an angle of approximately 90° regardless of the angle of the top rollers 28 that is selected, assuming no slip and no gearing effect (described below). The selected angle, however, affects the speed with which the objects will be diverted. Specifically, the larger the angle θ, the faster the object will be diverted. Notably, when the top rollers 28 are positioned at a 45° angle relative to the longitudinal direction of the belt, the objects will be diverted from the belt at a speed approximately equal to the speed of belt travel, again assuming no slip and no gearing effect.

FIG. 7 illustrates an embodiment of a conveyor 100 that can be used to control the positioning of conveyed objects. As indicated in FIG. 7, the conveyor 100 comprises a conveyor belt 102 and a drive mechanism 104 with which the belt can interact. In the embodiment of FIG. 7, the conveyor belt 102 comprises a plurality of conveyor belt modules 106 that are linked together to form the belt. The modules 106 are aligned in transverse rows 108 that extend across a width of the belt 102, and in longitudinal columns 110 that extend along a longitudinal direction of the belt, which coincides with the direction of belt travel indicated by arrow 112. By way of example, the modules 106 are pivotally connected to adjacent modules along the longitudinal direction of the belt 102 with transverse shafts 114. Like the modules 16 shown in FIG. 1, the modules 106 include roller sets that comprise a first or bottom roller 116 and second or top roller 118 that are arranged in a vertically-stacked configuration within an inner space 120 of the modules.

The drive mechanism 104 is used to drive the bottom and top rollers 116, 118 of the conveyor belt modules 106. As indicated in FIG. 7, the drive mechanism 104 can comprise a friction plate that is used to rotate the bottom rollers 116. In at least some embodiments, the friction plate has a high-friction top surface that reduces slip between the plate and the bottom rollers 116.

Figure 8:
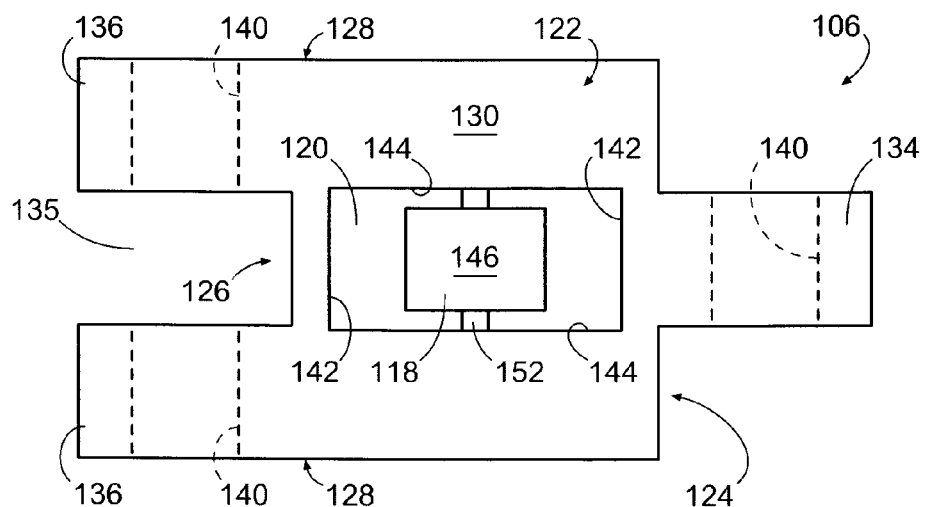
FIG. 8 is a top view of an embodiment of a conveyor belt module used in the conveyor of FIG. 7.
Figure 9:
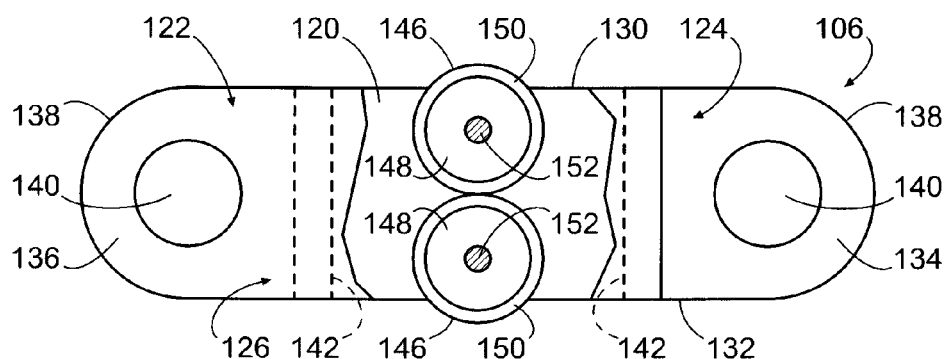
FIG. 9 is side view of the conveyor belt module of FIG. 8.

FIGS. 8 and 9 illustrate an example embodiment for the conveyor belt module 106. The module 106 is similar in many ways to the module 16 illustrated in FIGS. 2 and 3. Therefore, as indicated in FIGS. 8 and 9, the module 106 comprises a body 122 having a front end 124, a rear end 126, and opposed lateral sides 128. Furthermore, the body 122 includes a top surface 130 and a bottom surface 132. Again, the spatial terminology is used to reflect the orientation of the module 106 indicated in FIG. 7 and is not intended to be absolute.

As shown most clearly in FIG. 8, the conveyor belt module 106 further includes connection portions that extend from body 122. In the embodiment of FIGS. 8 and 9, the module 106 comprises a single connection portion 134 that extends from the front end 124 of the body 122 and two connection portions 136 that extend from the rear end 126 of the body separated by a gap 135. As shown most clearly in FIG. 3, each of the connection portions 134, 136 includes a rounded outer surface 138 and a transverse opening 140 that is adapted to receive a transverse shaft, such as shaft 114 shown in FIG. 7. When the diameter of the transverse shaft is smaller than the openings 140, the modules 106 can pivotally rotate relative to the shaft and vice versa.

The module body 122 further defines the inner space 120 first identified in relation to FIG. 7. As indicated in FIG. 8, the inner space 120 can, in some embodiments, comprise a generally rectangular cross-section, when viewed from the top or bottom, defined by opposed side walls 142 and opposed end walls 144. As further indicated in FIG. 8, the side walls 142 of the modules 106 are generally parallel to the lateral sides 128 of the module body 122 and, therefore, are generally parallel to a longitudinal axis of the module.

As is apparent from FIGS. 8 and 9, the bottom and top rollers 116, 118 are at least partially contained within the inner space 120 defined by the module body 122. As indicated in FIG. 9, outer surfaces 146 of the rollers 116, 118 contact each other such that rotation of one roller in a first direction causes opposite rotation of the other roller. A portion of the bottom roller 116 extends below the bottom surface 132 of the body 122 and a portion of the top roller 118 extends above the top surface 130 of the body. With such a configuration, the drive mechanism described in relation to FIG. 7 can contact the bottom roller 116 to cause it to rotate, and objects supported by the conveyor belt in which the module 116 is used can be displaced by the top roller 118.

Each roller 116, 118 can comprise a roller body 148 constructed of a polymeric or metal material that provides structure to the roller, and an outer layer 150 that is provided about an outer surface of the roller body and that forms the outer surface 146. In some embodiments, the outer layer 150 of each roller 116, 118 is composed of a high-friction material that reduces slip with mechanisms and/or objects it contacts.

As illustrated in both FIGS. 8 and 9, each roller 116, 118 is mounted within the inner space 120 on a roller shaft 152 that is supported by the module body 122. In some embodiments, the shafts 152 are supported by openings (not shown) formed in the body 122. In other embodiments, the shafts 152 are supported by brackets (not shown) provided within the inner space 120. Regardless, the shafts 152 are supported such that their associated rollers 116, 118 are placed in firm contact with each other to ensure that rotation of one roller (e.g., the bottom roller) will cause opposite rotation of the other roller (e.g., the top roller). As further illustrated in both FIGS. 8 and 9, the shafts 152 are oriented so as to be substantially perpendicular to the longitudinal axis of the module 106 and the conveyor belt in which it is used.

Figure 10:
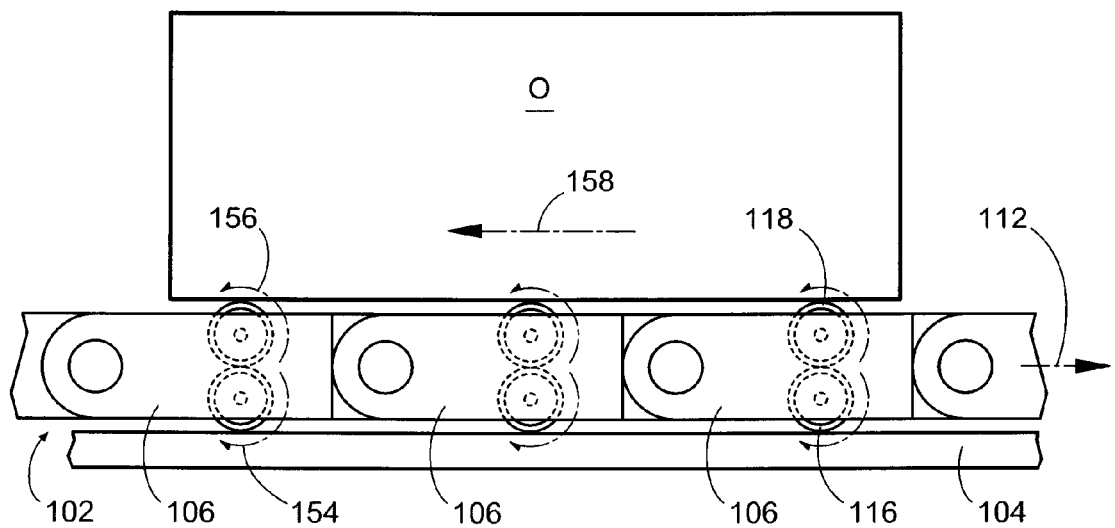
FIG. 10 is a side view of the conveyor of FIG. 7, illustrating displacing of an object conveyed by the conveyor.
Figure 11:
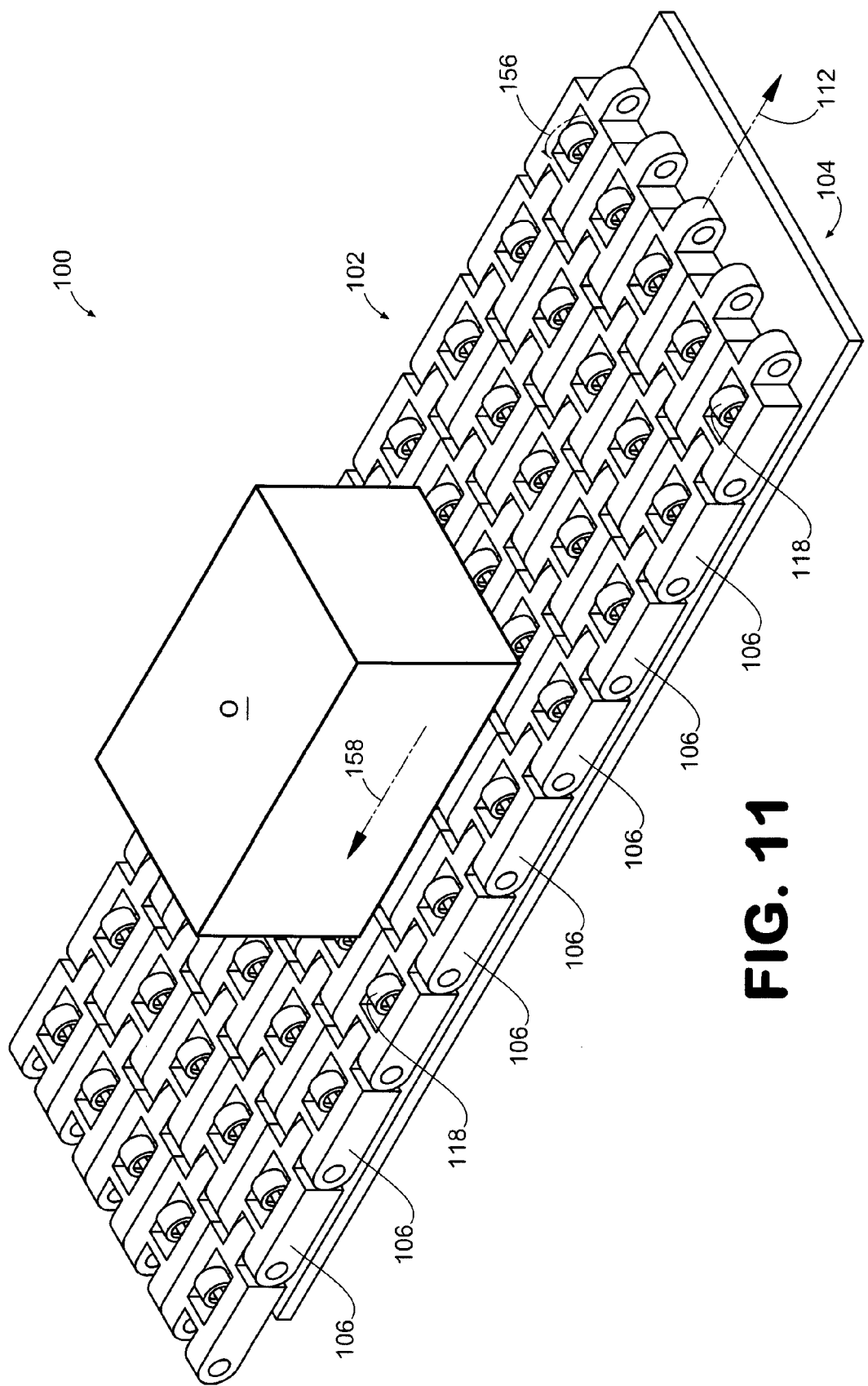
FIG. 11 is a top perspective view of the conveyor of FIG. 7, further illustrating displacing of the object by the conveyor.

FIGS. 10 and 11 illustrate displacement an object O on the conveyor 100. As indicated in FIG. 11, conveyor belt 102 travels along the drive mechanism 104 in the direction of arrow 112. As indicated in FIG. 10, contact between the bottom rollers 116 and the drive mechanism 104 causes the bottom rollers to rotate in a downstream direction indicated by arrows 154. Rotation of the bottom rollers 116 causes the top rollers 118 to rotate in an opposite, upstream direction, indicated by arrows 156. As shown in both FIGS. 10 and 11, the rotation of the top rollers 118 displaces the object O in a rearward direction relative to the belt 102 indicated by arrow 158. Assuming no slip between the bottom rollers 116 and the drive mechanism 114 and further assuming no slip between the top rollers 118 and the object O, the absolute position of the object will substantially not change because of the cancellation of its downstream movement by its upstream movement. In such a case, the object O will be held in place in an absolute sense. With such functionality, the transport of objects provided on the belt 102 can be selectively stopped by engaging the drive mechanism 104 with the bottom rollers 116 of the belt at a location at which the object is to be halted.

Figure 12:
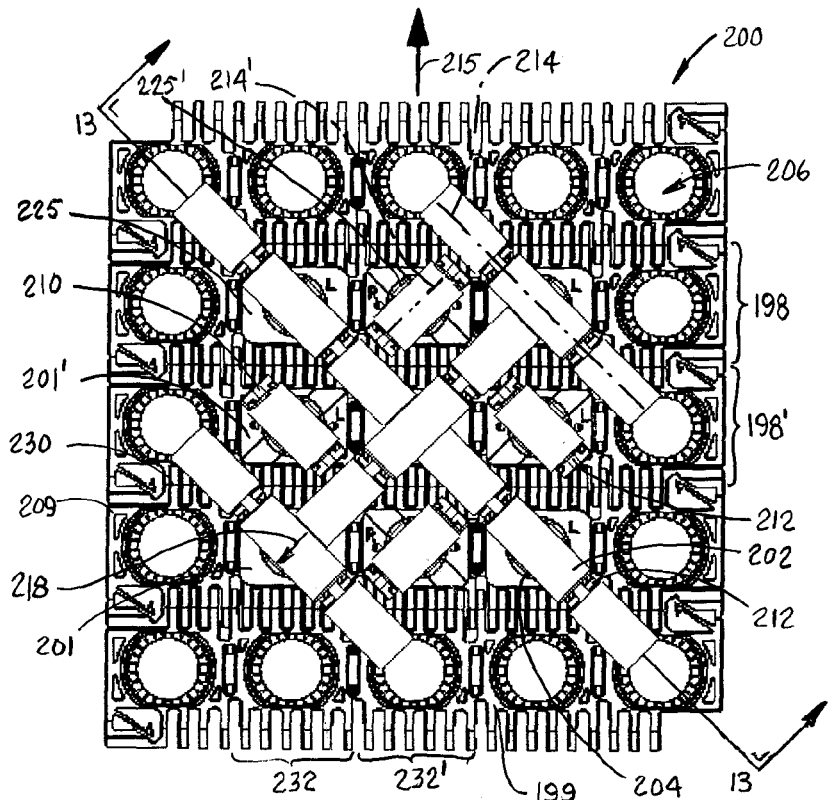
FIG. 12 is a top plan view of a portion of a conveyor belt embodying features of the invention including bi-directional top rollers.
Figure 13:
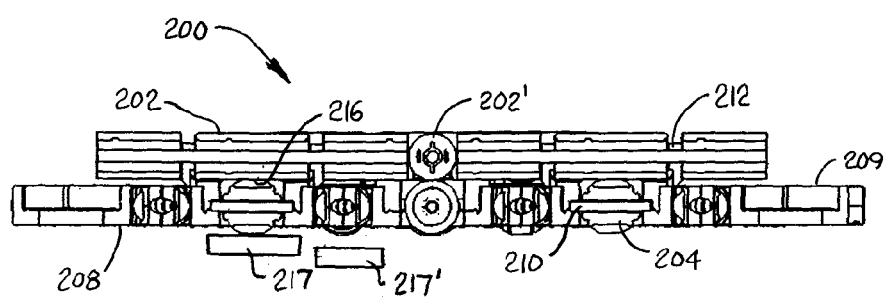
FIG. 13 is an enlarged cross section of the conveyor belt of FIG. 12 taken along lines 13-13.

FIG. 12 depicts five rows 198, 198' of belt modules 199 in a modular conveyor belt 200 having rollers sets 201, 201' each comprising a top roller 202, 202' and a bottom roller 204. Some of the roller sets 201 have long top rollers 202; the other roller sets 201' have short top rollers 202'. But both the long and short top rollers are elongated and axially longer than the bottom rollers 204. The bottom rollers 204 reside in cavities 206 on the modules 199. The bottom rollers 204 protrude beyond a bottom side 208 and an opposite top side 209 of the conveyor belt 200, as shown in FIG. 13. The elongated top rollers 202 are mounted for rotation on axles 210 whose ends are fixedly supported in supports 212 upstanding from the top side 209 of the conveyor belt 200. In this way, the top rollers lie entirely above the top surface of the belt. The axles 210 define axes of rotation 214, 214' angled, or oblique, to a direction of travel 215 of the conveyor belt 200. The bottom rollers are mounted in the cavities 206 on axles whose axes of rotation are parallel to the axes of rotation of the top rollers 202, 202'. A central peripheral surface 216 of the top roller frictionally engages the outside of the bottom roller. When contacted by a drive mechanism, such as an underlying bearing surface 217, for example, the outer periphery of an actuating roller or a carryway pan or wearstrips, the bottom rollers 204 ride in rotation along the bearing surface as the conveyor belt advances. When the conveyor belt 200 advances in the direction of belt travel 215, the bottom rollers 204 rotate in a first direction perpendicular to its axis of rotation. Contact between the bottom rollers and the top rollers causes the top rollers 202, 202' to rotate in an opposite direction 218 from the rotation of the bottom rollers.

Figure 14:
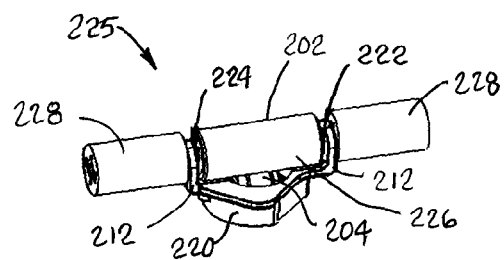
FIG. 14 is an isometric view of a roller set usable in a conveyor belt as in FIG. 12.

As shown in FIG. 14, the long top roller 202 and the bottom roller 204 are mounted on a base 220 having two roller supports 212 with slots 222 into which reduced-diameter axle portions 224 of the top roller are rotatably seated to form a roller set 225. The long top roller 202 is shown with three article-supporting roller segments: a central segment 226 flanked by a pair of end segments 228. The central segment 226 rides on the bottom roller 204. The reduced-diameter axle portions 224 join the segments. The base 220 of the roller set 225 is bonded, welded, or otherwise retained in place in the cavity 206. Roller sets 201' with short top rollers 202' are similarly mounted in the belt.

In odd belt rows 198 of the belt 200 of FIG. 12, long top-roller sets 225 with axes of rotation 214 at an angle of +45° relative to the longitudinal direction of the conveyor belt, i.e., the direction of belt travel 215, alternate with short top-roller sets 225' whose axes of rotation 214' are at an angle of −45°; i.e., perpendicular to the angles of the long top rollers. In other words, in this example, the angles of consecutive top rollers across the belt row 198 are mirror images of each other about the longitudinal direction 215. In even belt rows 198', the long top rollers 202 alternate laterally perpendicular to the longitudinal direction with short top rollers 202', but the short top rollers are at an angle of +45° and the long top rollers are at an angle of −45°. Both the long and short roller belts 225, 225' are centered in each belt row 198, 198' midway between hinge joints 230 between adjacent rows. Unlike the short rollers 202', the long rollers 202 extend past the hinge joints and over the adjacent belt row. In each belt row, the long rollers 202 overlap the adjacent short rollers 202' in the longitudinal direction. The roller sets 225, 225' are also arranged in longitudinal lanes 232, 232' extending along the length of the belt. All the bottom rollers 204 in the odd lanes 232 rotate in the same direction, and all the bottom rollers in the even lanes 232' rotate in the other direction. In this way, the roller sets in the odd lanes 232 can be actuated by contact with the bearing surfaces 217 (FIG. 13) underlying the odd lanes to push articles rearward and across the belt in the direction of arrow 218, while bearing surfaces 217' (FIG. 13) under the even lanes 232' are lowered out of contact with the bottom rollers of the roller sets in the even lanes. To divert articles rearward and across the belt in the other direction, the bearing surfaces 217 underlying the odd lanes 232 are lowered or otherwise moved out of contact with the bottom rollers, and the bearing surfaces 217' underlying the even lanes 232' of roller sets 225' are moved into contact. Thus, the conveyor can divert conveyed articles to either side. The bearing surfaces can be selectively actuated by conventional actuators, such as pneumatic, hydraulic, and electromechanical actuating devices.

Figure 15:
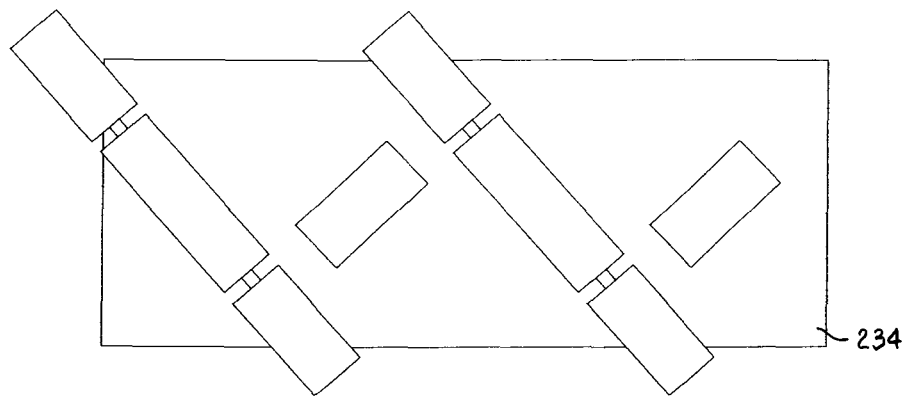
FIG. 15 is an enlarged plan schematic of one style of belt module usable in a conveyor belt as in FIG. 12.
Figure 16:
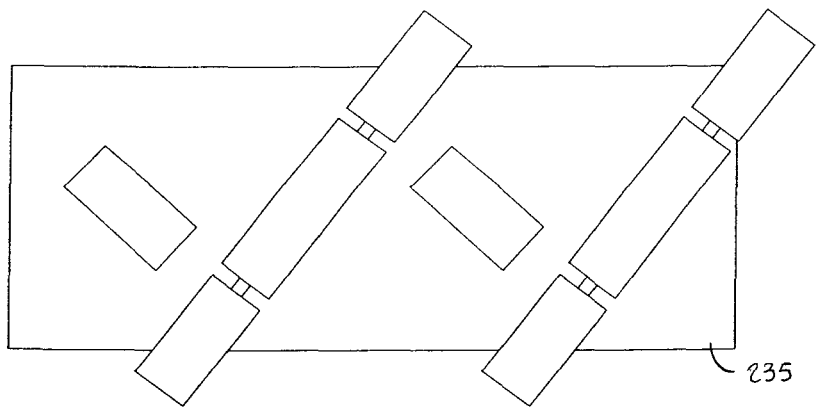
FIG. 16 is an enlarged plan schematic of another style of belt module usable in a conveyor belt as in FIG. 12.

The partial roller pattern illustrated in FIG. 12 is repeated across the majority of the surface area of the belt 200. In that way, the roller density is like that in the center of FIG. 12 everywhere except perhaps at the side edges of the belt. Wider belts than shown can be made by extending the roller pattern along and across the rows by connecting more belt modules together, such as the modules 234, 235 depicted in FIGS. 15 and 16. For example, the interior portion of a belt may be constructed of odd rows of a number of the belt modules 234 arranged side by side and of even rows of a number of the belt modules 235 arranged side by side, but laterally offset from the modules 234 in a conventional bricklay pattern.

Figure 23:
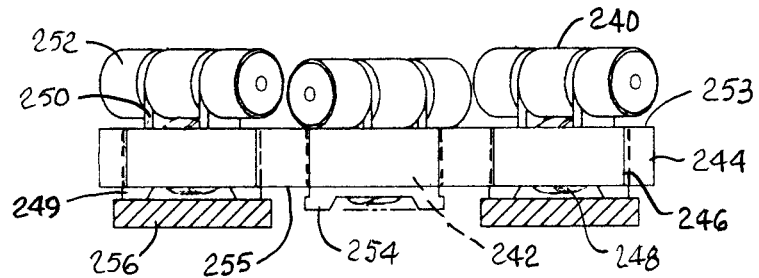
FIG. 23 is a front elevation view of a belt module embodying features of the invention including pop-up roller sets.

A conveyor belt module having pop-up roller sets is shown in FIG. 23. Each roller set 240 is mounted in a cavity 242 extending through the belt module 244. The roller sets 240 sit loosely in the cavities to that they can slide vertically between raised and lowered positions. Each roller set resides in a holder 246 that houses a lower roller 248 and forms a floating roller assembly 249 that can slide vertically through the belt module. Supports 250 for long top rollers 252 extend upward from the holders 246 above the top surface 253 of the module. The feet 254 on the lower base of the holders extend below the bottoms of the lower rollers 248 and the bottom side 255 of the module. This allows wearstrips 256 serving as bearing surfaces contacting the feet to raise the roller assemblies 249, without actuating the rollers into rotation, to a level higher than the level of roller sets not raised by wear strips, such as the middle roller set in FIG. 23. The feet 254 also retain the roller assembly 249 in the cavity 242. The raised roller sets are freely rotatable and support conveyed articles. By positioning wearstrips along the conveying path under lanes of roller sets having first parallel axes of rotation or under lanes of rollers having different second parallel axes of rotation, the belt can be programmed for receiving articles from one side of the belt or the other.

FIGS. 17-22 illustrate different constructions of the long top roller sets. In all these examples, the long top roller comprises two outer roller portions 258 flanking a center roller portion 260. The long top rollers 262 are supported on the supports 250 upstanding from the holder 246 in the module 244. But all the top-roller constructions are usable with any of the long top rollers described in this application.

Figure 17:
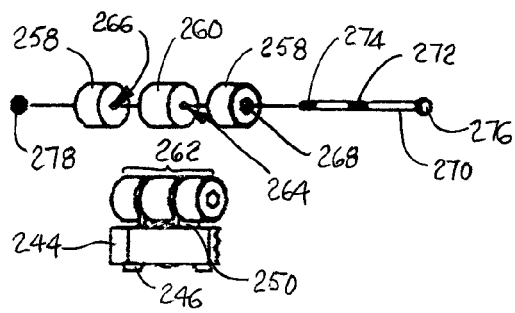
FIGS. 17-22 depict various other ways of constructing the top rollers of the conveyor belt of FIG. 12.
Figure 18:
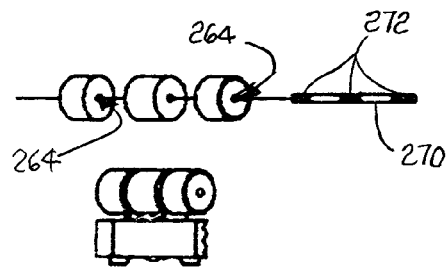
Figure 19:
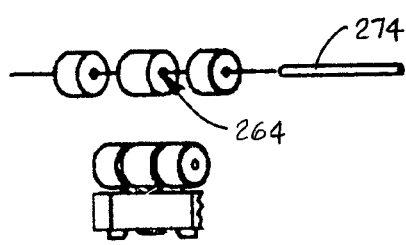
Figure 20:
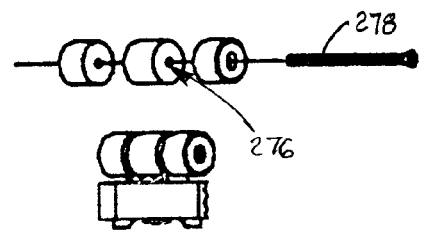
Figure 21:
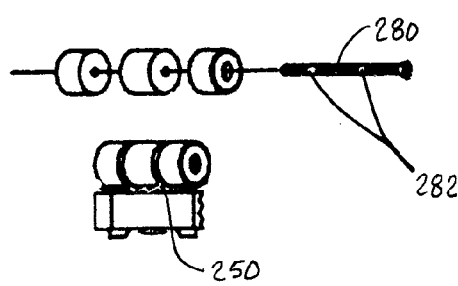
Figure 22:
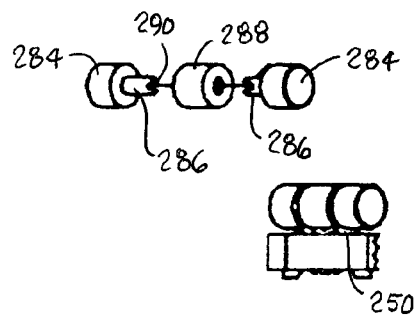

In FIG. 17, the central roller portion 260 has a narrow bore 264. The two outer roller portions 258 have through-hole bores 266 that terminate in hexagonal recesses 268 at the outer sides. A bolt 270 has a knurled portion 272 that is press-fitted into the narrow bore of the central roller portion 260. The bolt is threaded at the end 274 distal from its hexagonal head 276 to receive a nut 278. The nut and the hex head are received in the countersunk hexagonal recesses 268 in the outer roller portions and prevent them from rotating on the bolt. The bolt 270 is rotatably supported by the supports 250. In FIG. 18, all the roller portions have narrow bores 264. A pin 270 is knurled in three positions 272 and press-fitted into the narrow bores of each roller portion. In FIG. 19, a smooth pin 274 is press-fitted into the narrow bores 264 of all three roller portions. In FIG. 20, roller portions with threaded bores 276 are threaded onto a threaded bolt or screw 278. In FIG. 21, the threaded screw 280 is unthreaded at two positions 282 corresponding to the positions of the supports 250 to lower the rotational friction from that for the fully threaded screw of FIG. 20. In FIG. 22, each outer roller portion 284 has an integral shaft stub 286. The shaft stubs have snap retention structure 290 that allows the stubs to snap into position in the central roller portion 288 with gaps on the shaft between the roller portions for the supports 250. These are a few examples of various top-roller retention techniques.

Figure 24:
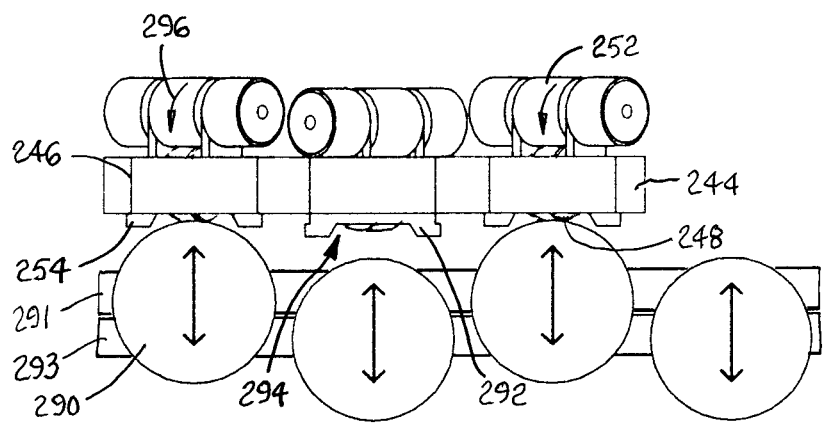
FIG. 24 is a front elevation view of a belt module as in FIG. 23 with selectively liftable longitudinal actuating rollers rotating the belt rollers.

The conveyor belt module 244 of FIG. 23 used with wearstrips not contacting the lower belt rollers 248 can be used to passively receive articles fed onto the belt from either side. When the belt module 244 is used with longitudinal rollers 290, as in FIG. 24, the belt rollers 248, 252 can be actively rotated by the longitudinal rollers as the belt advances along them. The lower base 292 of the holder 246 is scalloped with a recess 294 between the feet 254 to provide access for the freely rotatable, cylindrical bearing surface formed on the periphery of the longitudinal roller 290 to contact the lower roller 248. The longitudinal rollers 290 are grouped in two separate racks 291, 293. Each rack is selectively raised and lowered. When raised by the longitudinal rollers, the belt rollers are also actuated to rotate. When lowered, the belt rollers are deactuated. As shown in the example of FIG. 24, every other lane of belt rollers is raised and actuated by the raised longitudinal rollers 290. All the raised, actuated rollers rotate in the same direction 296 on parallel axes. To divert articles in the other direction, the raised longitudinal rollers 290 in the first rack 291 are lowered and the lowered rollers in the second rack 293 are raised. When lowered, the longitudinal rollers are preferably out of contact with the lower belt rollers 248.

Figure 25:
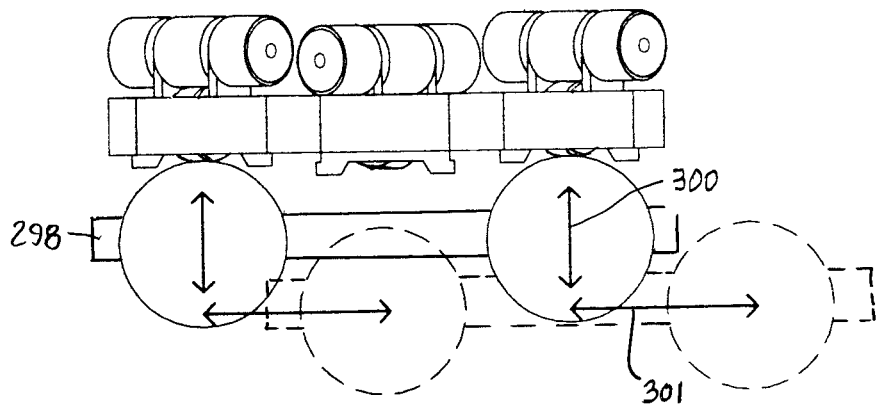
FIG. 25 is a front elevation view of a belt module as in FIG. 23 with selectively liftable and translatable longitudinal actuating rollers.

FIG. 25 shows a different version of longitudinal roller activation. In this version, a single shifting rack 298 is movable up and down to actuate and deactuate rollers and translatable left and right to select actuation of leftward-diverting lanes of belt rollers or rightward-diverting lanes. The vertical raising and lowering of the longitudinal rollers and the left-to-right translation, as indicated by the arrows 300, 301, can be effected by actuators, such as linear actuators, rack gears, electromechanical actuators, or the like.

Figure 26:
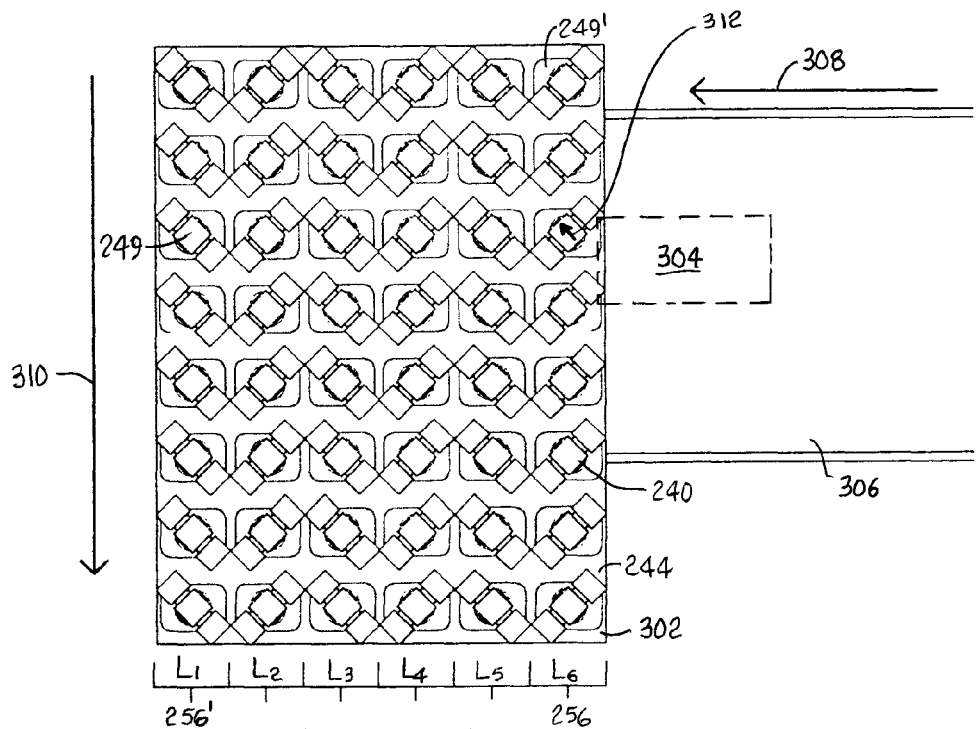
FIG. 26 is a top plan view of a portion of a conveyor having a conveyor belt constructed of belt modules as in FIG. 23 and fed by a side-on infeed conveyor.

FIG. 26 shows a portion of a conveyor belt 302 constructed of rows of belt modules 244 hingedly linked end to end. The belt has longitudinal lanes $L_1$-$L_6$ of floating roller assemblies 249. The roller sets 240 in all the odd lanes $L_1$, $L_3$, $L_5$ are arranged to rotate on first parallel axes; the roller sets in the even lanes $L_2$, $L_4$, $L_6$ are arranged to rotate on different second parallel axes. To passively transfer an article 304 onto the conveyor belt 302 from an infeed conveyor 306 advancing in the direction of arrow 308, wearstrips 256 under the even lanes $L_2$, $L_4$, $L_6$ are raised to elevate the even belt roller assemblies 249' in the even lanes without contacting the lower belt roller (as in FIG. 23). As the belt 244 advances in a direction of belt travel 310, the raised roller sets in the even lanes rotate rearward as shown by arrow 312 under the momentum of the article 304 to ease its transfer onto the belt 302. Once the article has transferred completely onto the belt, the wearstrips 256' underlying the odd lanes $L_1$, $L_3$, $L_5$ of rollers are raised to brake the motion of the articles in the direction of the arrow 312. Because the axes of the rollers in the odd lanes are parallel to the arrow 312, i.e., perpendicular to the axes of the rollers in the even lanes, frictional contact with the long top rollers in their axial direction brakes the motion and prevents the initial momentum of the article from advancing it too far across the belt.

Figure 27:
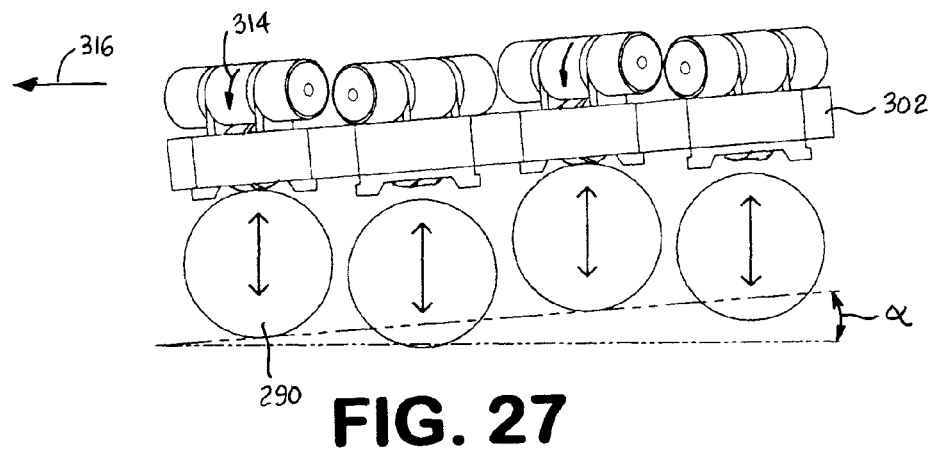
FIG. 27 is a front elevation view of a conveyor as in FIG. 24 tilted to transfer product off the side.

In FIG. 27, the longitudinal rollers 290 are lifted at an angle α off horizontal to tilt the belt 302. The raised lanes of roller sets are actuated by contact with the raised longitudinal rollers to rotate as indicated by arrows 314 to transfer articles off the tilted section of the belt in the direction of arrow 316 with the additional help of gravity.

Figure 28:
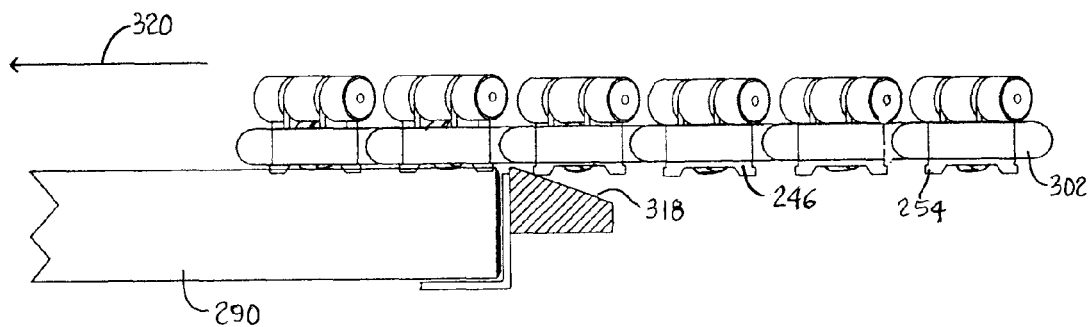
FIG. 28 is a side elevation view of a conveyor using a conveyor belt as in FIG. 26 with a ramped entry to the actuating rollers.

As shown in FIG. 28, a ramp 318 may be used to help guide the bases of the lowered holders 246 up to the level of the longitudinal rollers 290 to prevent the feet 254 from catching on the front edges of the rollers as the belt 302 advances in a direction of belt travel 320.

Figure 29:
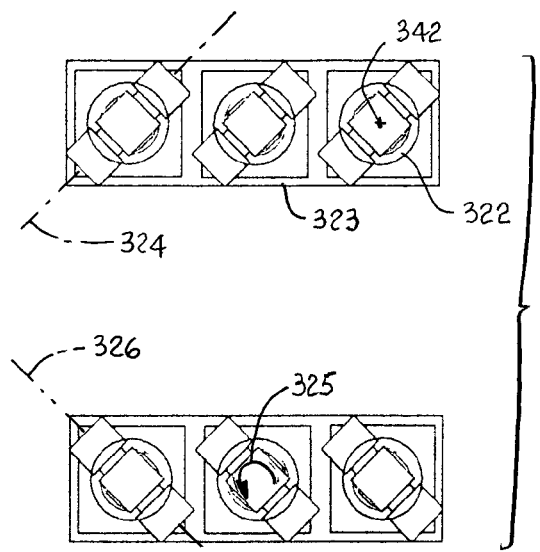
FIG. 29 is a top plan view of a portion of a conveyor belt module as in FIG. 23, but with roller sets pivotable about an axis normal to the plane of the belt.
Figure 30:
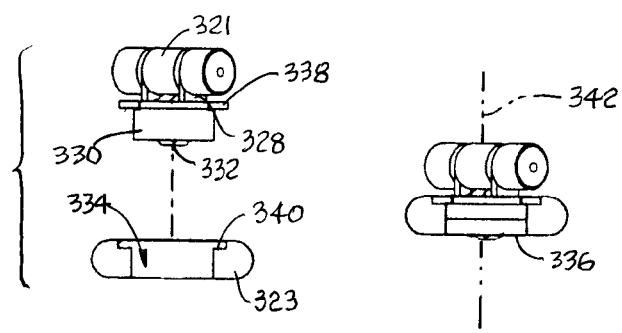
FIG. 30 depicts an exploded and an unexploded side view of one version of a pivotable roller set in a belt module as in FIG. 23.

The conveyor belts and modules shown in FIGS. 23-28 have floating roller assemblies 249 with longitudinal lanes of rollers alternating in direction of rotation across the width of the belt on fixed axes. In FIGS. 29 and 30, the roller assemblies 322 in a belt module 323 are pivotable about vertical axes 342 normal to the plane of the belt; i.e., the plane of the sheet in FIG. 29. In the upper figure, the roller assemblies rotate on first axes 324; in the lower figure, the roller assemblies are pivoted in the direction of arrow 325 to rotate on different second axes 326, for example, perpendicular to the first axes. The long top roller 321 of the pivotable roller assembly 322 is supported on supports 328 extending upward from a holder 330 having a base with a circular periphery. The lower roller 332 is mounted on an axle (not shown) whose ends are retained in the base at diametrically opposite positions. The circular base is pivotably received in a round hole 334 in the module 323 with the bottom of the lower roller protruding below the bottom side 336 of the module. A weld cap ring 338, not affixed to the roller assembly 322, is bonded adhesively, welded sonically, or otherwise fastened to a circular seat 340 at the upper end of the hole 334. The weld cap ring 338 retains the holder 330 in the module free to pivot about a vertical axis 342. Thus, by adjusting the pivot angle of the roller assemblies, a belt constructed of these modules 323 can actively sort to the left or right or passively receive articles from either side.

Figure 31:
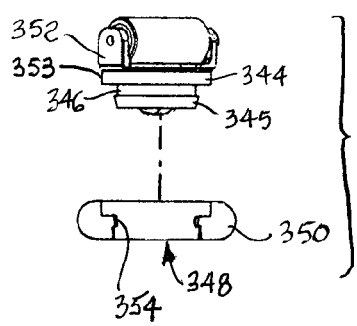
FIG. 31 is an exploded view of a snap-in pivotable roller set in a belt module as in FIG. 23.
Figure 32:
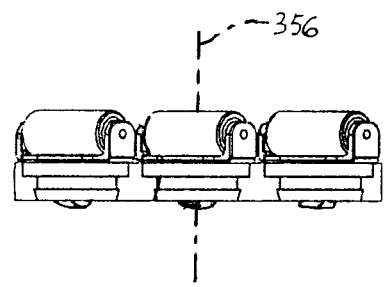
FIG. 32 is a front elevation view of the belt module of FIG. 31.

FIGS. 31 and 32 illustrate a snap-in version of the holder's circular base for a pivotable roller assembly 352. A holder 353 has a wider upper portion 344, a narrower lower portion 345, and a narrowmost intermediate portion 346. A cavity 348 through the belt module 350 is complementary in shape to the base of the roller assembly 352 with an intermediate rim 354 forming retention structure bounding the cavity. The lower portion 345 of the base snaps over the retention structure and is retained in place so that the assembly can pivot about a vertical axis 356.

Figure 33:
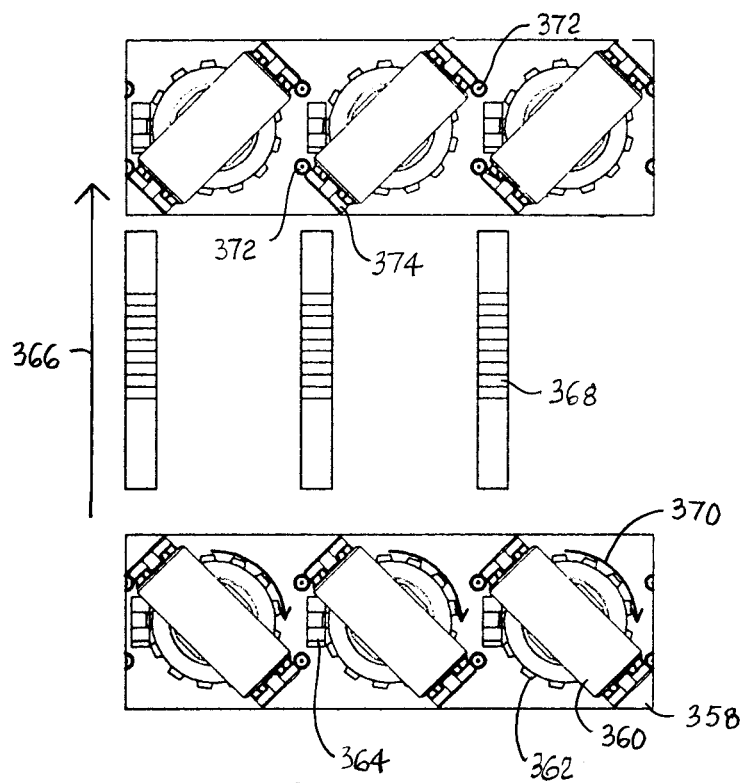
FIG. 33 is a top plan view of a portion of a conveyor using a conveyor belt with a pivotable roller set pivoting from below by a rack and pinion gear.

A portion of a belt module 358 having roller assemblies of stacked roller sets mounted in pivotable holders 360 is shown before and after pivoting in FIG. 33. Pivot elements in the form of external gear teeth 362 on the peripheries of the holders 360 engage pinion gears 364 that rotate on horizontal axes and protrude past the bottom of the module. As the module advances with the belt in the direction of belt travel 366, the pivot elements receive a force that causes the holders to pivot. The pinion gears 364 engage pivot members in the form of rack gears 368 underlying the belt in the carryway and aligned laterally with the pinion gears. The engagement of the gears pivots the roller assemblies in the direction of arrow 370 so that they can rotate on their axes in a different direction; e.g., toward the other side of the belt. Vertical posts 372 upstanding from the module limit the pivot range of the roller assembly by forming a stop against roller supports 374. The rack gears 368 in the carryway may be selectively moved up and down or laterally into and out of engagement with the pinion gears 364.

Figure 34:
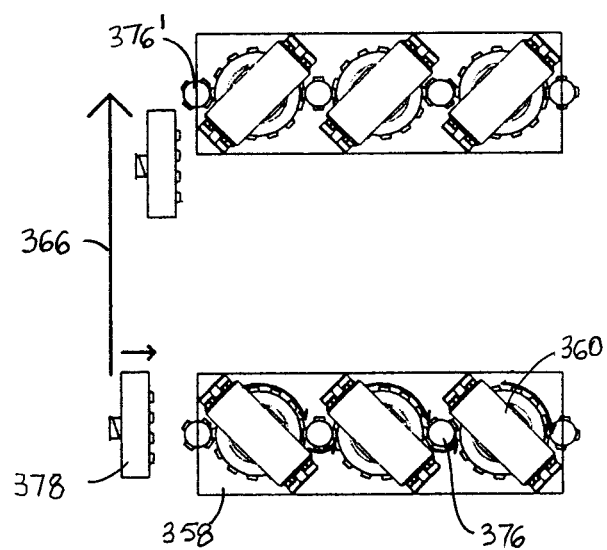
FIG. 34 is a top plan view of a portion of the conveyor using a conveyor belt with a pivotable roller set pivoted from the side of the belt by a rack and pinion gear train.

Another version of a pivotable roller assembly is shown in FIG. 34. In this version, the gear teeth 362 on the peripheries of the holders 360 engage pinion gears 376 that rotate about vertical axes. The pinion gears 376 between consecutive roller assemblies 360 engage the gear teeth 362 of each. In that way, a gear train is formed across the width of the belt module 358. A pivot member in the form of a rack gear 378 at the side of the belt engages the pinion 376' at the side of the belt to pivot the roller assemblies as the belt advances in the direction of belt travel 366. The rack gear 378 may be moved into and out of contact with the outer pinions by an actuator.

Another version of a pivotable roller assembly is shown in FIG. 35. The assembly's holder 380 has a roller cap 382 with a channel 384 formed along a portion, e.g., 90°, of its periphery. An inset member 386, such as a post, upstanding from the module 358 in the channel 384 acts as a position limiter limiting the pivot range of the roller assembly by contact with the ends 388 of the channels. The roller assemblies with pivotable holders 390 shown in FIGS. 36 and 37 each have a base 391 from which a pivot element in the form of a cam arm 392 extends downward below the bottom surface of the belt module and below the longitudinal rollers 290. The cam arm follows a pivot member in the form of a guide track 394 disposed below the belt and the longitudinal rollers. Lateral jogs in the guide track followed by the cam arms cause the roller assemblies to pivot into different orientations.

Figure 38:
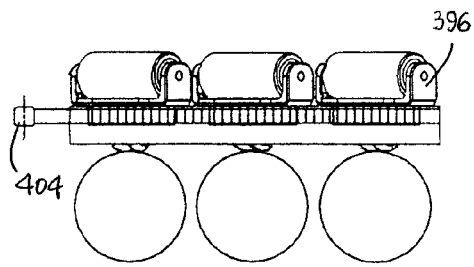
FIG. 38 is a top plan view of a conveyor using a conveyor belt with pivotable roller sets pivoted by a cam rail at the side of the belt engaging a cam follower on the belt.
Figure 39:
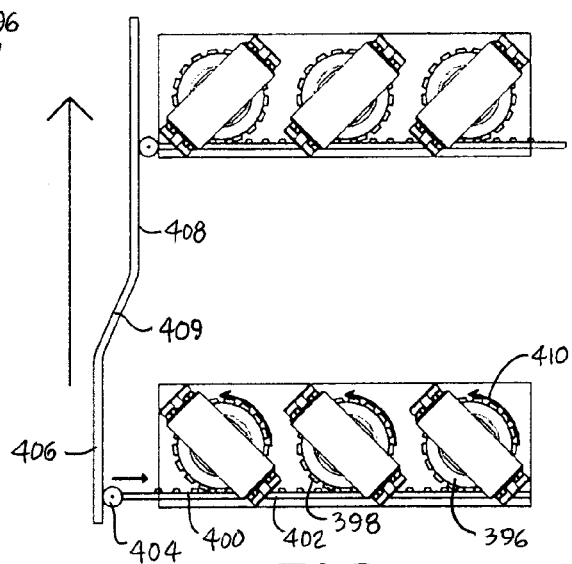
FIG. 39 is a top plan view of the conveyor of FIG. 38.

In FIGS. 38 and 39, each of the pivotable holders 396 of the roller assemblies have external gear teeth 398 acting as a pinion gear meshed with a rack gear 400 formed on a laterally extending cam arm 402. The rack gear on the cam arm engages the gear teeth of all the roller assemblies on the module. The cam arm 402 extends outward past the sides of the module and terminates in a cam follower 404, such as a roller. An external pivot member in the form of a cam guide 406 at the side of the conveyor has a cam surface 408 on which the follower 404 rolls. Moving the cam arm 402 to the right in FIG. 39 as the belt advances past a jog 409 in the guide pivots the roller assemblies counterclockwise as indicated by arrow 410.

Figure 40:
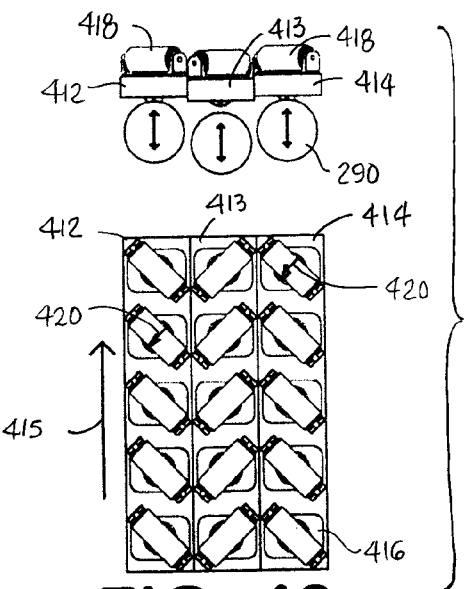
FIG. 40 depicts front elevation and top plan views of a portion of a conveyor constructed of parallel strands of belts each having one lane of roller sets, in which selected strands are selectively raised and lowered.
Figure 41:
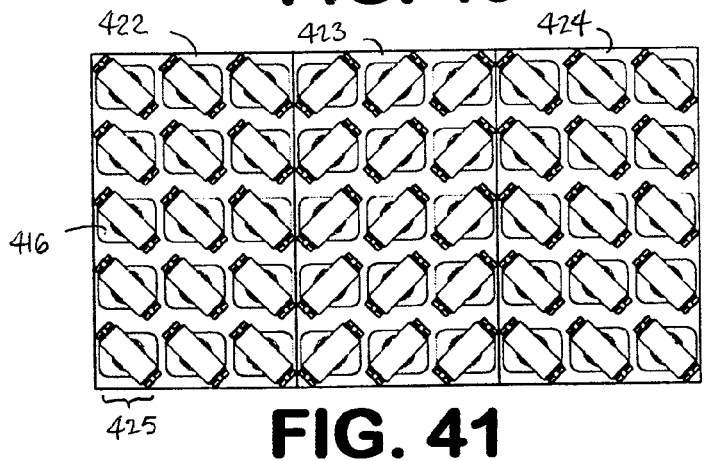
FIG. 41 is a top plan view of another multi-strand conveyor as in FIG. 40 in which each strand has three lanes of roller sets.

Bidirectional sorting can also be achieved through the use of parallel strands of stacked-roller belts. In FIG. 40, three belt strands 412, 413, 414 advance together in parallel in a conveying direction 415. The three strands represent only a portion of the width of the inline conveyor. The roller assemblies 416 in each strand do not float within a cavity. They are also shown as non-pivotable. But each of the strands can be individually raised or lowered relative to the others by liftable longitudinal rollers 290. For example, the outside strands 412, 414 with belt rollers 418 rotatable in one direction are raised and actuated by the longitudinal rollers to rotate leftward and rearward in the direction of the arrows 420 as the strands advance in the conveying direction 415. The middle strand 413 shown in FIG. 40 is lowered and does not support conveyed articles. The conveyor's sortation direction can be switched to the other side by lowering the outer strands 412, 414 and raising and actuating the middle strand 413 with the middle longitudinal roller. As shown in FIG. 41, each strand 422, 423, 424 can include multiple lanes 425 of roller assemblies 416 of the same orientation. Each multi-lane strand could then be individually lifted and lowered and its roller assemblies selectively actuated.

Figure 42:
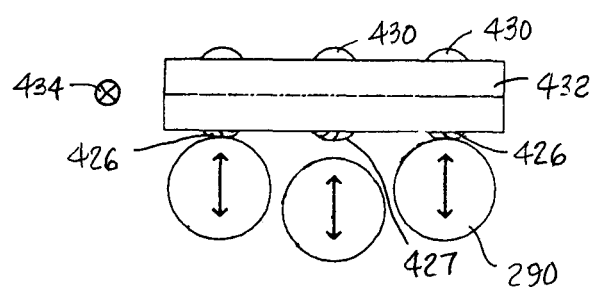
FIG. 42 is a front elevation view of a conveyor using a conveyor belt with stacked roller sets in which the top roller is a roller ball.
Figure 43:
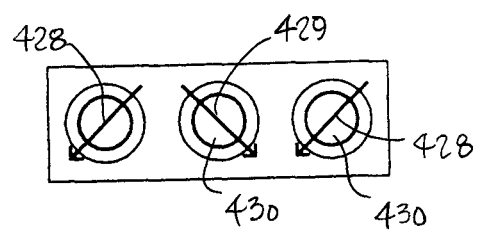
FIG. 43 is a top plan view of the conveyor of FIG. 42.

Another version of a roller assembly useable in a bidirectional sorting conveyor is shown in FIGS. 42 and 43. Each roller assembly has a bottom roller 426, 427 rotatable on an oblique axle (not shown, but perpendicular to the arrows 428, 429 in FIG. 43). Thus, the axles for the outer lower rollers 426 are parallel to each other, but not to the axle of the middle roller 427. The top roller 430 in each roller assembly is a spherical roller, or roller ball, sitting atop its associated lower roller. When the lower rollers are actuated by rolling contact with a longitudinal roller 290, the top ball rollers rotate in the directions given by arrows 428, 429 as the belt constructed of these modules 432 travels into the page of FIG. 42 as indicated by arrow tail 434.

While particular embodiments have been disclosed in detail in the foregoing description and drawings for purposes of example, those skilled in the art will understand that variations and modifications can be made without departing from the scope of the disclosure.

What is claimed is:
1. A conveyor belt comprising:
   a plurality of first roller sets arranged in first lanes extending in a longitudinal direction of the conveyor belt, wherein each of the first roller sets includes a first roller and a second roller, the first and second rollers contacting each other such that driving of the first roller in a first angular direction causes rotation of the second roller in an opposite second angular direction, wherein the first and second rollers have axes of rotation arranged at a first angle relative to the longitudinal direction of the conveyor belt;
   a plurality of second roller sets arranged in second lanes parallel to the first lanes, wherein each of the second roller sets includes a third roller and a fourth roller, the third and fourth rollers contacting each other such that driving of the third roller in a third angular direction causes rotation of the fourth roller in an opposite fourth angular direction, wherein the third and fourth rollers have axes of rotation arranged at a second angle relative to the longitudinal direction of the conveyor belt different from the first angle;
   wherein some of the second rollers are segmented rollers divided into peripheral segments connected by axle portions across gaps between adjacent segments, the conveyor belt further comprising supports upstanding from a top surface of the conveyor belt rotatably connected to the axle portions of the segmented rollers.

2. A conveyor belt as in claim 1 wherein the first angle is a reflection of the second angle about the longitudinal direction.

3. A conveyor belt as in claim 1 wherein the second angular direction is perpendicular to the fourth angular direction.

4. A conveyor belt as in claim 1 wherein the first roller and the second roller are arranged in a stack in which the first roller is a bottom roller and the second roller is a top roller positioned above the bottom roller and wherein the third roller and the fourth roller are arranged in a stack in which the third roller is a bottom roller and the fourth roller is a top roller positioned above the bottom roller.

5. A conveyor belt as in claim 4 further comprising a plurality of holders slidably mounted in the conveyor belt, wherein each of the first and second roller sets is retained in one of the holders for sliding between raised and lowered positions.

6. A conveyor belt as in claim 5 wherein the holders have scalloped bottoms forming recessed portions below which salient portions of the bottom rollers extend and feet that extend below the salient portions of the bottom rollers.

7. A conveyor belt as in claim 4 further comprising a plurality of holders pivotably mounted in the conveyor belt, wherein each of the first and second roller sets is retained in one of the holders for pivoting about a vertical axis and changing the first and second angles of the axes of rotation of the roller sets.

8. A conveyor belt as in claim 7 wherein the holders include external gear teeth.

9. A conveyor belt as in claim 1 wherein the first and second roller sets are arranged in lateral rows perpendicular to the longitudinal direction and wherein the first and second roller sets are alternately arranged across a major portion of each row.

10. A conveyor belt as in claim 1 wherein the axle portions are exposed portions of an axle joining the peripheral segments in axial alignment.

11. A conveyor belt comprising:
a plurality of first roller sets arranged in first lanes extending in a longitudinal direction of the conveyor belt, wherein each of the first roller sets includes a first roller and a second roller, the first and second rollers contacting each other such that driving of the first roller in a first angular direction causes rotation of the second roller in an opposite second angular direction, wherein the first and second rollers have axes of rotation arranged at a first angle relative to the longitudinal direction of the conveyor belt;
a plurality of second roller sets arranged in second lanes parallel to the first lanes, wherein each of the second roller sets includes a third roller and a fourth roller, the third and fourth rollers contacting each other such that driving of the third roller in a third angular direction causes rotation of the fourth roller in an opposite fourth angular direction, wherein the third and fourth rollers have axes of rotation arranged at a second angle relative to the longitudinal direction of the conveyor belt different from the first angle;
wherein the first roller and the second roller are arranged in a stack in which the first roller is a bottom roller and the second roller is a top roller positioned above the bottom roller and wherein the third roller and the fourth roller are arranged in a stack in which the third roller is a bottom roller and the fourth roller is a top roller positioned above the bottom roller;
wherein some of the top rollers are long rollers and the other of the top rollers are short rollers having axially shorter lengths than the long rollers.

12. A conveyor belt as in claim 11 wherein the top rollers in each of the first lanes are alternately long rollers and short rollers and wherein the top rollers in each of the second lanes are alternately short rollers and long rollers.

13. A conveyor belt as in claim 11 further comprising a series of rows of conveyor belt modules linked together at hinge joints between adjacent rows and wherein the first and second rollers sets in a row are centered midway between the hinge joints and wherein the top rollers are alternately long rollers and short rollers across the row wherein the long rollers extend past the hinge joints and the short rollers extend between adjacent long rollers.

14. A conveyor belt as in claim 11 wherein the first and second roller sets are arranged in lateral rows perpendicular to the longitudinal direction and wherein the second roller is longer than the fourth roller in odd rows and the fourth roller is longer than the second roller in even rows.

15. A conveyor belt as in claim 14 wherein the second roller overlaps adjacent fourth rollers in the longitudinal direction in odd rows and the fourth roller overlaps adjacent second rollers in the longitudinal direction in even rows.

16. A conveyor belt comprising:
a plurality of holders pivotably retained in the conveyor belt;
a plurality of stacked roller sets, each having a top roller and a bottom roller rotatably mounted in one of the holders, the top and bottom rollers contacting each other such that driving of the bottom roller in an angular direction relative to a direction of belt travel causes rotation of the top roller in an opposite angular direction;
wherein the holders include pivot elements on the peripheries of the holders for receiving a force to pivot the stacked roller sets between a first angular direction and a different second angular direction.

17. A conveyor belt as in claim 16 wherein the conveyor belt has a plurality of cavities extending through the thickness of the conveyor belt and retention structure bounding the cavity and wherein the holders have snap-in structure engaging the retention structure to pivotably retain the holders in the cavities.

18. A conveyor belt as in claim 16 wherein the pivot elements are teeth on the periphery of the holder.

19. A conveyor belt as in claim 18 further comprising a rack or pinion gear engaged with the teeth.

20. A conveyor belt as in claim 16 wherein the pivot elements are cam arms extending outward of the belt.

21. A conveyor belt as in claim 16 further comprising a pair of stops for each holder positioned on the conveyor belt to limit the angular extent of the pivoting of the roller sets.

22. A conveyor comprising:
a conveyor belt including:
a plurality of holders pivotably retained in the conveyor belt;
a plurality of stacked roller sets, each having a top roller and a bottom roller rotatably mounted in one of the holders, the top and bottom rollers contacting each other such that driving of the bottom roller in an angular direction relative to a direction of belt travel causes rotation of the top roller in an opposite angular direction;
wherein the holders include pivot elements for receiving a force to pivot the stacked roller sets between a first angular direction and a different second angular direction;

a pivot member external to the conveyor belt coupled to the pivot elements to apply the force to pivot the stacked roller sets.

23. A conveyor as in claim 22 wherein the conveyor belt further includes a plurality of pinion gears and wherein the pivot elements are teeth around the periphery of the holder engaged with at least one of the pinion gears and wherein the pivot member comprises a rack gear proximate the conveyor belt and positioned to engage with the pinion gears as the conveyor belt advances in the direction of belt travel to pivot the holders.

24. A conveyor as in claim 22 wherein the conveyor belt further includes a rack gear that engages the teeth of at least one of the holders and has a cam follower at one end extending outward past a side of the conveyor belt and wherein the pivot member comprises a guide disposed outward of the side of the conveyor belt and having a cam surface followed by the cam follower.

25. A conveyor as in claim 22 wherein the pivot elements are cam arms extending below the conveyor belt and wherein the pivot member comprises a guide surface below the belt engaged by the cam arms to pivot the holders as the conveyor belt advances in the direction of belt travel.

26. A conveyor as in claim 22 further comprising bearing surfaces underlying the conveyor belt and movable into contact with the bottom rollers to cause the bottom and top rollers to rotate as the conveyor belt advances in the direction of belt travel.

27. A conveyor comprising:
a conveyor belt including:
a plurality of first roller sets arranged in first lanes extending in a longitudinal direction of the conveyor belt, wherein each of the first roller sets includes a bottom roller and a top roller, the bottom and top rollers contacting each other such that driving of the bottom roller in a first angular direction causes rotation of the top roller in an opposite second angular direction, wherein the bottom and top rollers have axes of rotation arranged at a first angle relative to the longitudinal direction of the conveyor belt;
a plurality of second roller sets arranged in second lanes parallel to the first lanes, wherein each of the second roller sets includes a bottom roller and a top roller, the bottom and top rollers contacting each other such that driving of the bottom roller in a third angular direction causes rotation of the top roller in an opposite fourth angular direction, wherein the bottom and top rollers have axes of rotation arranged at a second angle relative to the longitudinal direction of the conveyor belt different from the first angle;
a plurality of holders supporting the first and the second roller sets and slidably mounted in the conveyor belt for being raised and lowered;
bearing surfaces underlying the conveyor belt under the first and second lanes to raise the first and second roller sets by contact with the holders;
wherein the holders have a lower portion that extends below a bottom of the conveyor belt and provides a lift surface against which the bearing surfaces push to raise the holders without contacting the bottom rollers.

28. A conveyor as in claim 27 further comprising actuators coupled to the bearing surfaces to selectively move the bearing surfaces into contact with the holders of the first or the second roller sets to selectively elevate the top rollers in the first lane or the top rollers in the second lane such that articles ride atop rollers rotatable in the same direction.

29. A conveyor as in claim 27 wherein the bearing surfaces are formed on freely rotatable cylindrical peripheries of longitudinal rollers and the holders extend below a bottom of the conveyor belt and wherein the holders are scalloped at the bottom to provide access to the bottom rollers by the cylindrical peripheries of the longitudinal rollers.

30. A conveyor as in claim 27 further comprising a ramp disposed at an upstream end of the bearing surfaces and forming an extension of the bearing surfaces that contacts and gradually raises the holders before contact with the bearing surfaces.

31. A conveyor as in claim 27 wherein the lower portion of the holders have feet at the bottom below the bottom rollers.

32. A conveyor as in claim 27 wherein the conveyor belt and the bearing surfaces are tilted off horizontal along axes parallel to the longitudinal direction of the conveyor belt.

33. A conveyor comprising:
a plurality of conveyor belt strands arranged side by side to advance together in a longitudinal direction of belt travel;
each of the conveyor belt strands including one or more longitudinal lanes of roller sets, each including a top roller and a bottom roller in contact with the bottom roller, wherein the bottom roller of each of the sets extends below the bottom of the conveyor belt strand and rotation of the bottom roller in a rotation direction causes the top roller to rotate in an opposite rotation direction;
wherein the rotation direction of a first set of the conveyor belt strands is in a first direction and the rotation direction of a second set of the conveyor belt strands is in a different second direction;
wherein the conveyor belt strands include a plurality of holders supporting the roller sets and slidably mounted in the conveyor belt strands for being raised and lowered;
a plurality of longitudinal bearing surfaces underlying the longitudinal lanes of roller sets;
actuators coupled to the bearing surfaces to selectively raise or lower the bearing surfaces into or out of contact with the bottom rollers to selectively raise or lower the conveyor belt stands and to cause the bottom rollers to rotate on the raised bearing surfaces and be freely rotatable when the bearing surfaces are lowered;
a ramp disposed at an upstream end of the longitudinal bearing surfaces and forming an extension of the bearing surfaces that contacts and gradually raises the holders before contact with the bearing surfaces.

34. A conveyor as in claim 33 wherein the actuators simultaneously raise all the bearing surfaces underlying the first set of conveyor belt strands while all the bearing surfaces underlying the second conveyor belt strands are lowered.

* * * * *